(12) United States Patent
Dong et al.

(10) Patent No.: US 10,635,803 B2
(45) Date of Patent: Apr. 28, 2020

(54) METHOD AND DEVICE FOR UNLOCKING TERMINAL

(71) Applicant: Alibaba Group Holding Limited, Grand Cayman (KY)

(72) Inventors: Hang Dong, Hangzhou (CN); Zhen Yuan, Hangzhou (CN); Ling Wang, Hangzhou (CN); Zhuolin Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/153,634

(22) Filed: Oct. 5, 2018

(65) Prior Publication Data

US 2019/0042724 A1 Feb. 7, 2019

Related U.S. Application Data

(63) Continuation of application No. PCT/CN2017/078254, filed on Mar. 27, 2017.

(30) Foreign Application Priority Data

Apr. 8, 2016 (CN) .......................... 2016 1 0218284

(51) Int. Cl.
  *G06F 21/36* (2013.01)
  *G06F 3/0487* (2013.01)
  *G06F 21/45* (2013.01)
  *G06F 3/0488* (2013.01)

(52) U.S. Cl.
  CPC ............ *G06F 21/36* (2013.01); *G06F 3/0487* (2013.01); *G06F 21/45* (2013.01); *G06F 3/04883* (2013.01)

(58) Field of Classification Search
  CPC ........ G06F 21/36; G06F 21/45; G06F 3/0487; G06F 3/04883
  See application file for complete search history.

(56) References Cited

U.S. PATENT DOCUMENTS

| | | |
|---|---|---|
| 9,298,358 B1 | 3/2016 | Wilden et al. |
| 2010/0162182 A1 | 6/2010 | Oh et al. |

(Continued)

FOREIGN PATENT DOCUMENTS

| | | |
|---|---|---|
| CN | 101968709A A | 2/2011 |
| CN | 102866846A A | 1/2013 |

(Continued)

OTHER PUBLICATIONS

Translation of Chinese Search Report dated Jun. 30, 2017, from corresponding Chinese PCT Application No, PCT/CN2017/078254, 2 pages.

(Continued)

*Primary Examiner* — Chuong A Ngo
(74) *Attorney, Agent, or Firm* — Lee & Hayes, P.C.

(57) ABSTRACT

A method that includes displaying a masking image layer on a terminal screen when receiving a start instruction used to start an application; receiving an unlocking instruction input based on the masking layer; if the unlocking instruction matches a preset instruction, starting the application. The present disclosure solves the technical problem in the conventional techniques of relatively low terminal unlock method security.

17 Claims, 33 Drawing Sheets

(56) References Cited

U.S. PATENT DOCUMENTS

| | | | | |
|---|---|---|---|---|
| 2012/0143706 | A1* | 6/2012 | Crake | G06Q 20/20 |
| | | | | 705/18 |
| 2013/0249828 | A1* | 9/2013 | Sie | G06F 3/041 |
| | | | | 345/173 |
| 2013/0321452 | A1* | 12/2013 | Kawalkar | G09G 3/20 |
| | | | | 345/629 |
| 2014/0244272 | A1* | 8/2014 | Shao | G06F 3/01 |
| | | | | 704/275 |
| 2015/0067560 | A1* | 3/2015 | Cieplinski | G06F 3/04842 |
| | | | | 715/765 |
| 2016/0227010 | A1 | 8/2016 | Jung et al. | |

FOREIGN PATENT DOCUMENTS

| | | |
|---|---|---|
| CN | 104158947A A | 11/2014 |
| CN | 104166515 A | 11/2014 |
| CN | 104317507 A | 1/2015 |
| CN | 104714641A A | 6/2015 |
| CN | 2015125691A A | 7/2015 |
| CN | 105159591 A | 12/2015 |
| CN | 105447373 A | 3/2016 |
| EP | 2843917 A1 | 3/2015 |
| KR | WO2015/037960 A1 | 3/2015 |

OTHER PUBLICATIONS

Translation of Chinese Written Opinion dated Jun. 30, 2017, from corresponding Chinese PCT Application No. PCT/CN2017/078254, 4 pages.

Extended European Search Report dated Sep. 27, 2019 for European Patent Application No. 17778603.5, 9 pages.

Translation of Chinese Office Action from corresponding CN Patent Application No. 201610218284.0, 11 pages.

* cited by examiner

METHOD AND DEVICE FOR UNLOCKING TERMINAL

CROSS REFERENCE TO RELATED PATENT APPLICATIONS

This application claims priority to and is a continuation of PCT Patent Application PCT/CN2017/078254, filed on 27 Mar. 2017, which claims the priority of the Chinese Patent Application No. 201610218284.0, filed on 8 Apr. 2016, entitled "Method and Device for Unlocking Terminal", which are incorporated in the present disclosure by reference in their entire contents.

TECHNICAL FIELD

The present disclosure relates to the field of terminals, and more particularly, to methods and devices for unlocking a terminal.

BACKGROUND

A terminal (such as a mobile phone, a tablet, a smartwatch, etc.) usually enters a locked state in order to prevent the terminal from being misused by a user in the sleep mode. Normally, the user needs to unlock the terminal to use the terminal. In addition, the user can also set some application software installed on the terminal to be in the locked mode. When the user needs to open the application software, the user can unlock the application through a preset unlocking method. At present, common terminal unlocking methods generally include password unlocking, graphic swiping unlocking, fingerprint unlocking, voiceprint unlocking, etc. Although the above unlocking methods have advantages in convenience and security respectively, they all have characteristics that the unlocking interface is relatively weak in terms of concealment and the unlocking method is highly indicative. For example, in a case where a terminal is illegally held by another person, if this person intends to open an application on the terminal, the unlocking interface of the application will be presented on the screen of the terminal in an intuitive way after the icon of the application is tapped. If the unlocking interface is a password unlocking interface or a graphic swiping unlocking interface, the illegal holder may even use the unlocking software or the exhaustive method to crack the password or track of the application, thereby stealing or modifying the data in the application. Therefore, generally speaking, unlocking methods in the conventional techniques are relatively intuitive with a high indication, while the concealment and security are insufficient.

In summary, there is a technical problem in the conventional techniques that methods for unlocking a terminal are less secure.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An example embodiment of the present disclosure provides a method and device for unlocking a terminal to at least solve the technical problem of low security of the method for unlocking a terminal in the conventional techniques.

According to an aspect of the present disclosure, a method for unlocking a terminal is provided. The method includes: displaying a masking layer on a screen of a terminal in a case where a start instruction for starting an application is received; receiving an unlocking instruction input based on the masking layer; starting the application in a case where the unlocking instruction matches a preset instruction.

According to another aspect of the present disclosure, a device for unlocking a terminal is provided. The device includes: a first display unit configured to display a masking layer on a screen of a terminal in a case where a start instruction for starting an application is received; a receiving unit configured to receive an unlocking instruction input based on the masking layer; a starting unit configured to start the application in a case where the unlocking instruction matches a preset instruction.

In an example embodiment of the present disclosure, with the manner of displaying a masking layer on the screen of the terminal when receiving a start instruction for starting an application, receiving the unlocking instruction input based on the masking layer, and starting the application in a case where the unlocking instruction matches a preset instruction, the purpose of starting the application in a case where the unlocking instruction matches the preset instruction is realized by displaying the masking layer on the screen of the terminal when the start instruction for starting the application is received, and then receiving the unlocking instruction input based on the masking layer. Therefore, the technical effect of enhancing the concealment and diversity of the terminal unlocking method and improving the security of the terminal unlocking method is realized and the technical problem that the terminal unlocking method in the conventional techniques is less secure is solved.

BRIEF DESCRIPTION OF THE DRAWINGS

The drawings illustrated herein are used to provide a further understanding of the present disclosure and form a part of the present disclosure. Illustrative example embodiments of the present disclosure and descriptions thereof are used to interpret the present disclosure without limiting the present disclosure improperly. In the drawing.

DETAILED DESCRIPTION

In order to enable a person of ordinary skill in the art to better understand the solution of the present disclosure, technical solutions of example embodiments of the present disclosure will be clearly and completely described hereinafter with reference to the drawings of example embodiments of the present disclosure. Apparently, the example embodiments described herein are merely some example embodiments of the present disclosure, but not all of the example embodiments. Based on example embodiments of the present disclosure, all other example embodiments obtained by a person of ordinary skill in the art without creative efforts should fall within the protection scope of the present disclosure.

It should be noted that terms "first", "second", and the like in the description, claims, and the above drawings of the present disclosure are used to distinguish similar objects and are not necessarily used to describe a specific sequence or order. It will be understood that the data used in this way may be interchanged where appropriate so that example embodiments of the present disclosure described herein can be implemented in another sequence except for those illustrated or described herein. In addition, terms "comprise" and "include" and variations thereof are intended to cover a non-exclusive inclusion, for example, a process, method, system, product, or apparatus that comprises a series of steps or units is not necessarily limited to those explicitly listed steps or units, but may include other steps or units not explicitly listed or inherent to such processes, methods, products, or apparatus.

First Example Embodiment

According to an example embodiment of the present disclosure, an example embodiment of the method for unlocking a terminal is also provided. It should be noted that the steps shown in the flowchart of the drawings may be performed in such as a computer system stored with a set of computer-executable instructions. Although the logical order is shown in the flowchart, in some cases the steps shown or described may be performed in an order different than that herein.

Figure 1:
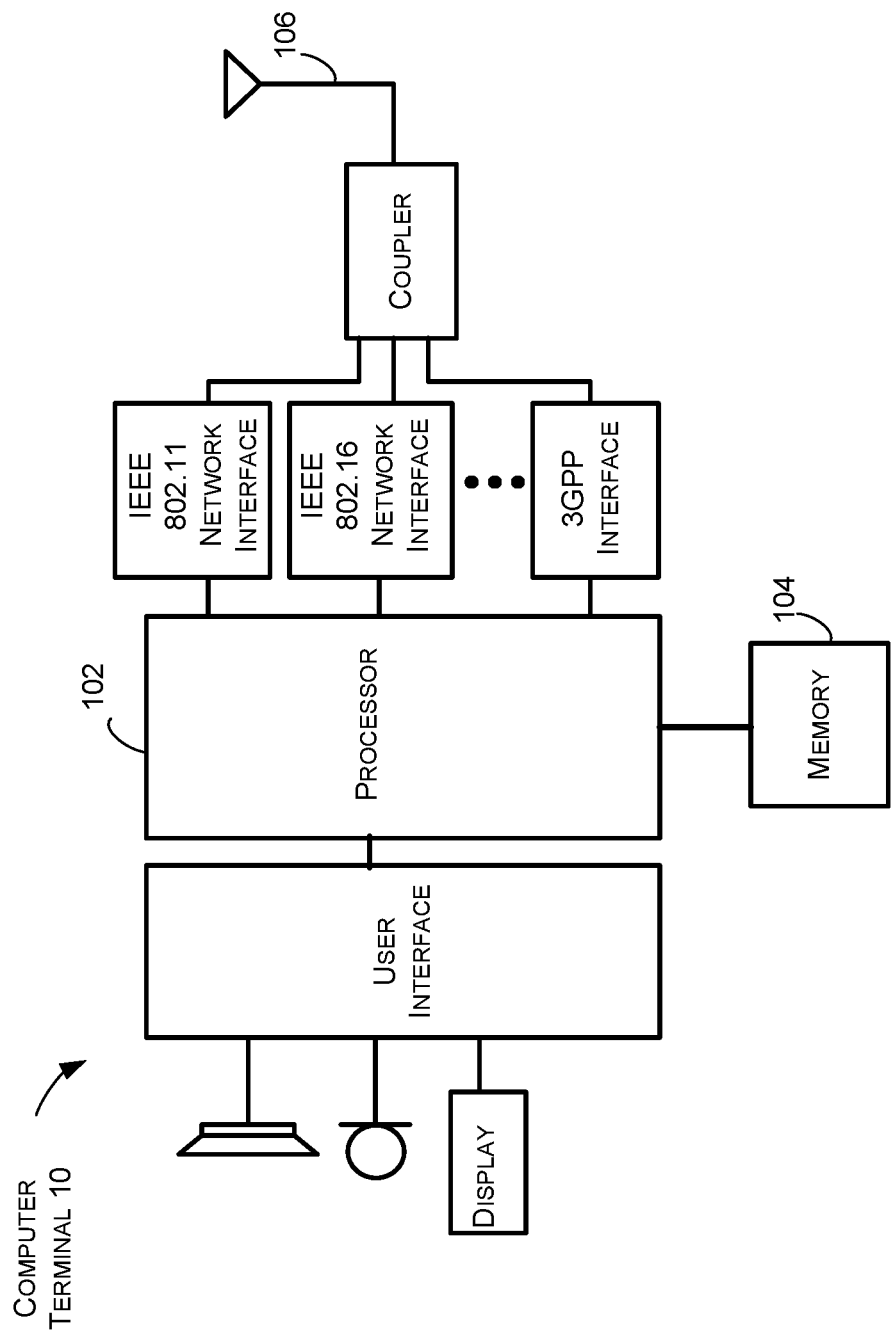
FIG. 1 is a block diagram showing the hardware structure of a computer terminal according to a method for unlocking a terminal.
Figure 2A:
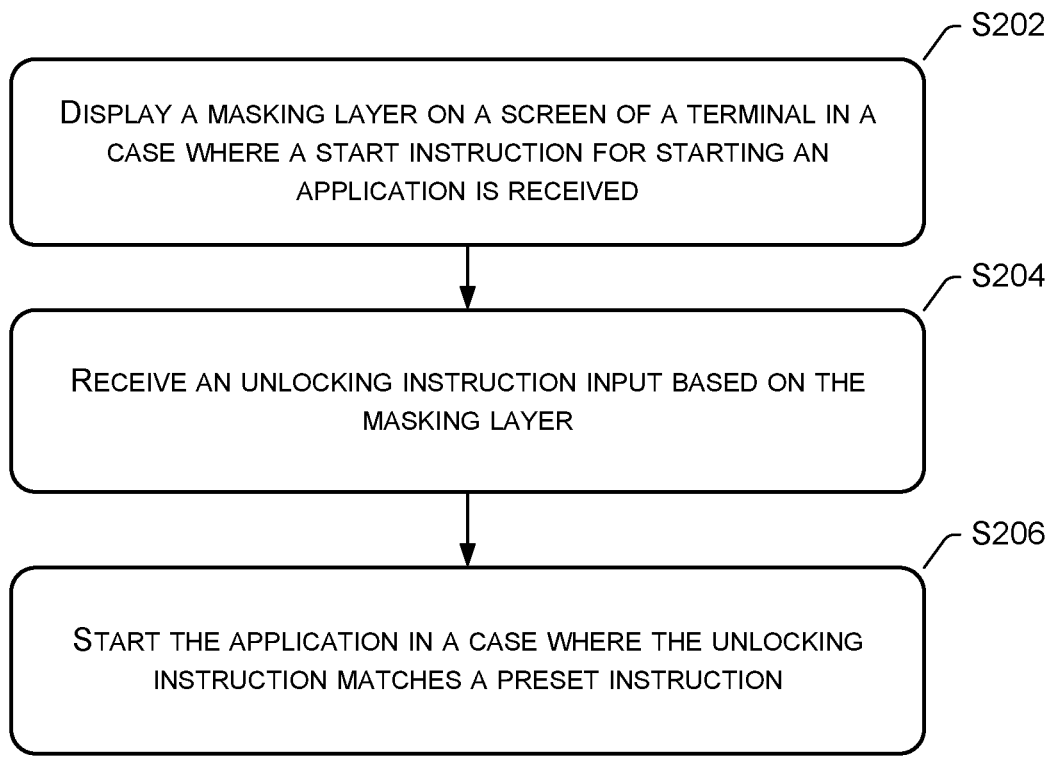
FIG. 2(a) is a schematic flowchart of an example method for unlocking a terminal according to an example embodiment of the present disclosure.
Figure 2B:
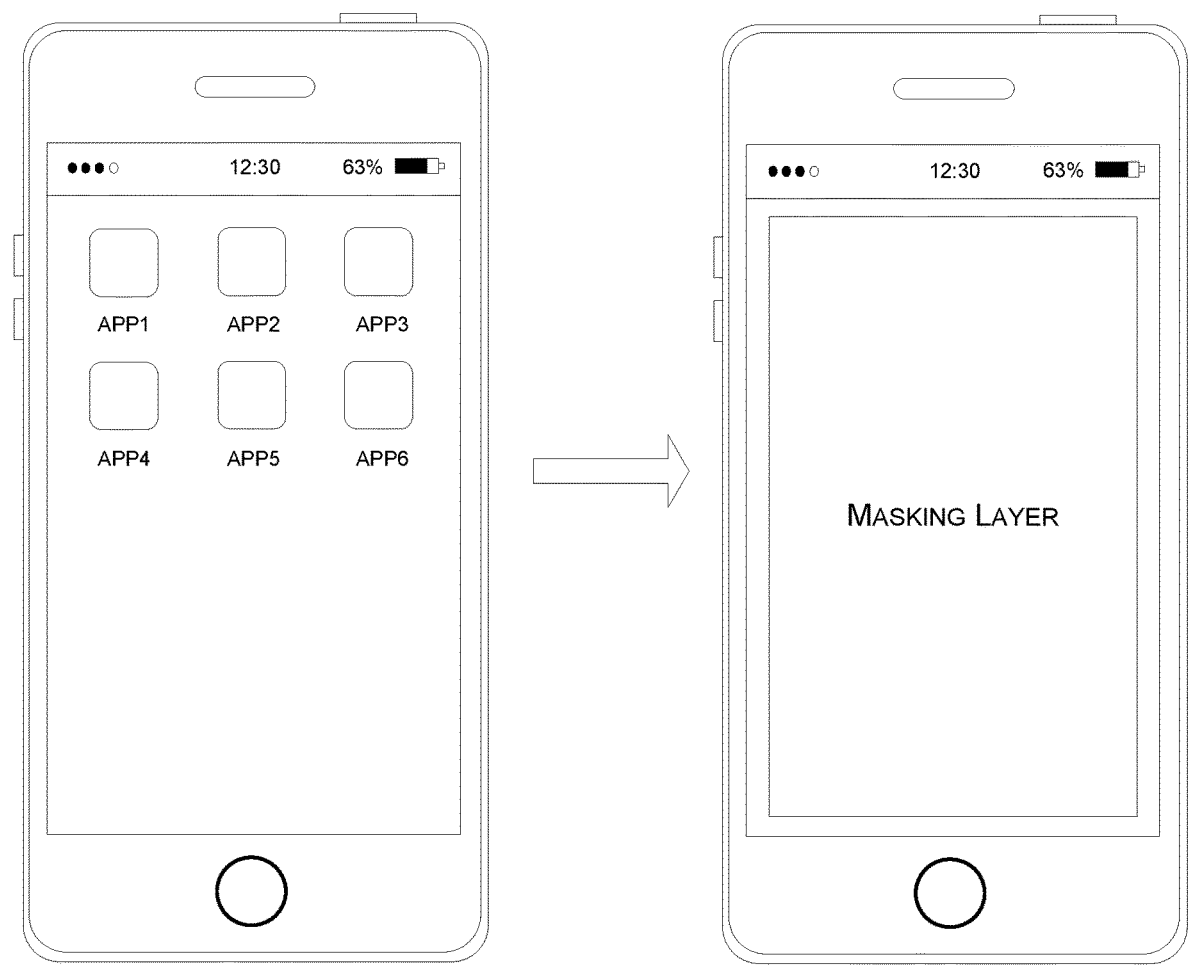
FIG. 2(b) is a schematic diagram of an example method for unlocking a terminal according to an example embodiment of the present disclosure.
Figure 2C:
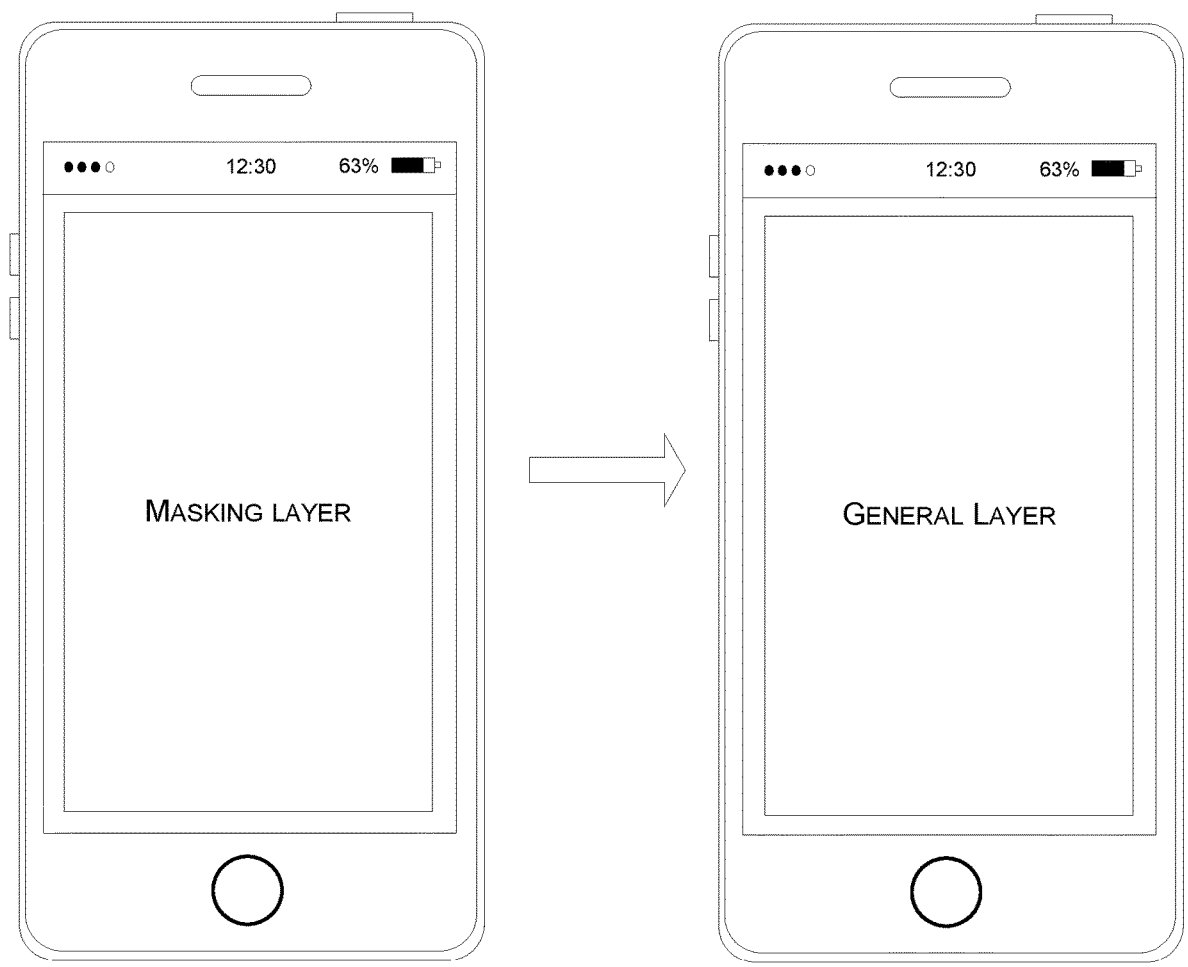
FIG. 2(c) is a schematic diagram of another example method for unlocking a terminal according to an example embodiment of the present disclosure.
Figure 2D:
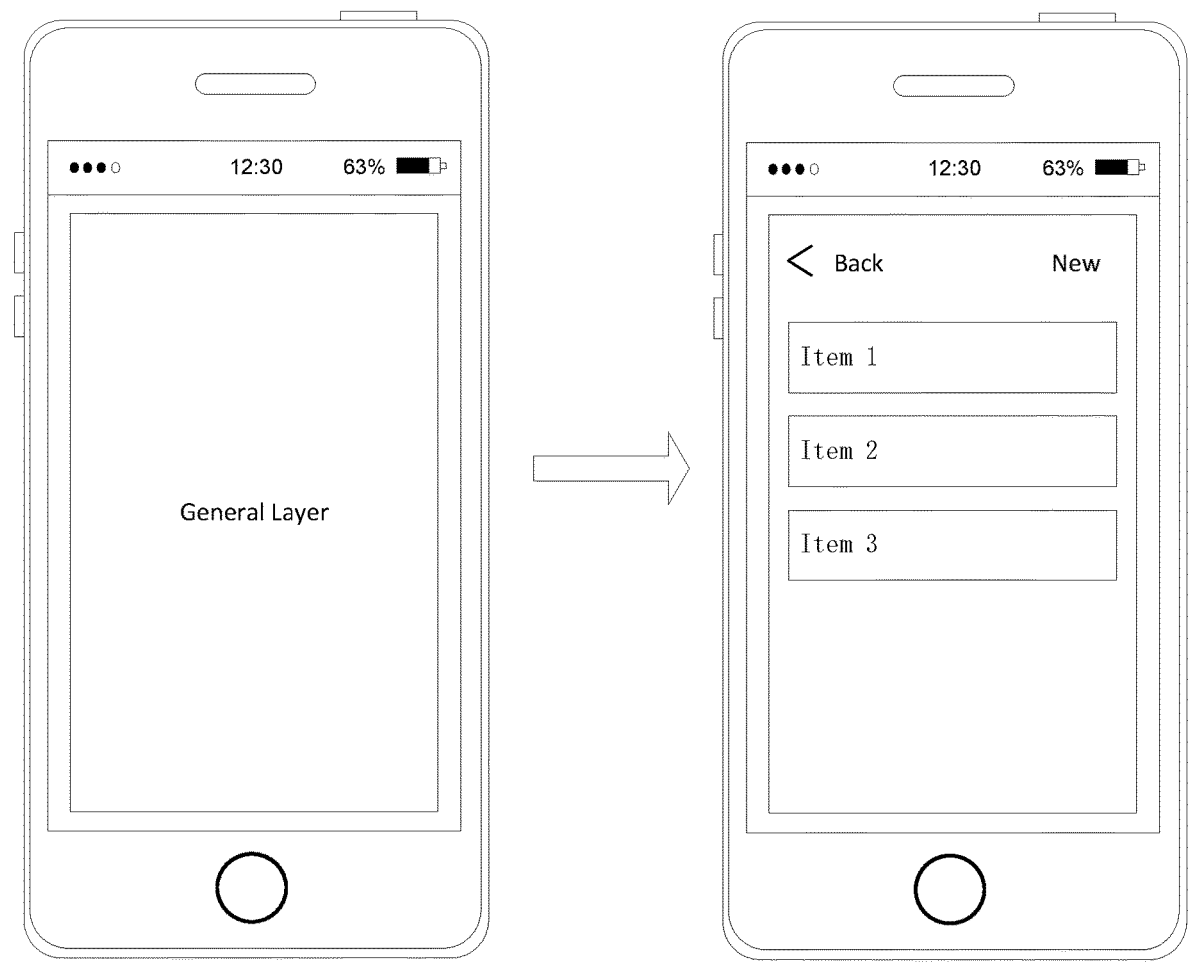
FIG. 2(d) is a schematic diagram of yet another example method for unlocking a terminal according to an example embodiment of the present disclosure.

An example embodiment of the present disclosure can be implemented in a mobile terminal, a computer terminal, or the like. Taking the operation on the computer terminal as an example, FIG. 1 is a block diagram showing the hardware structure of a computer terminal of a method for unlocking a terminal of an example embodiment of the present disclosure. As shown in FIG. 1, computer terminal 10 may include one or more (only one is shown in the drawings) processor 102 (processor 102 may include, but is not limited to, a processing device such as a microprocessor MCU or a programmable logic device FPGA), a memory 104 for storing data, and a transmission device 106 for communication functions. A person of ordinary skill in the art can understand that the structure shown in FIG. 1 is merely illustrative and does not limit the structure of the above electronic device. For example, the computer terminal 10 may also include more or fewer components than those shown in FIG. 1 or have a different configuration than that shown in FIG. 1.

The memory 104 can be used to store software programs and modules of the application software, such as program instructions/modules corresponding to the method for unlocking a terminal in the example embodiment of the present disclosure. The processor 102 runs the software programs and modules stored in the memory 104, thereby performing various functional applications and data processing. That is, the method for unlocking a terminal of the above application is realized. The memory 104 may include high-speed random access memory, and may also include non-volatile memory, such as one or more magnetic storage devices, flash memory, or other non-volatile solid-state memory. In some examples, the memory 104 may further include memory remotely located with respect to the processor 102. Such remote memories may be connected to the computer terminal 10 via a network. Examples of the above networks include, but are not limited to, the Internet, intranets, local area networks, mobile communication networks, and combinations thereof.

The transmission device 106 is used to receive or transmit data via a network. Examples of the above network may include a wireless network provided by a communication provider of the computer terminal 10. In one example, the transmission device 106 includes a Network Interface Controller (NIC), which can be connected to other network devices through a base station to communicate with the Internet. In one example, the transmission device 106 can be a Radio Frequency (RF) module for communicating with the Internet wirelessly.

In the above operating environment, the present disclosure provides an example embodiment of the method for unlocking a terminal as shown in FIG. 2(*a*). FIG. 2(*a*) is a schematic flowchart of a method for unlocking a terminal according to an example embodiment of the present disclosure.

As shown in FIG. 2(*a*), the method for unlocking a terminal may include the following implementation steps.

Step S202: displaying a masking layer on a screen of a terminal in a case where a start instruction for starting an application is received.

Step S204: receiving an unlocking instruction input based on the masking layer.

Step S206: starting the application in a case where the unlocking instruction matches a preset instruction.

With the receiving example embodiment for starting the application, the masking layer is displayed on the screen of the terminal, and then the unlocking instruction input based on the masking layer is received. The purpose of starting the application in a case where the unlocking instruction matches the preset instruction is reached. Therefore, the technical effect of enhancing the concealment, diversity, and the security of the method for unlocking a terminal is achieved. The technical problem of low security of methods for unlocking a terminal in the conventional techniques is also solved.

In an example embodiment, the application can be installed on the terminal. The application can also be an application remotely controlled by the terminal.

In an example embodiment, in the above step S202 of the present disclosure, the terminal may be a mobile phone, a smartwatch, a tablet computer, a notebook computer with a touch screen, etc. The user of the terminal can make the terminal to generate a start instruction for starting the application by tapping the icon of the application. The masking layer can be displayed in full screen or partially on the screen of the terminal. The masking layer can be a frosted glass layer (also known as a clouded glass layer) or a monochromatic layer.

In an example embodiment, FIG. 2(*b*) is a schematic diagram of an example vulnerability detection method according to an example embodiment of the present disclosure. As shown in FIG. 2(*b*), the terminal can be a mobile phone. A total of six application icons are displayed on the current home screen interface of the mobile phone. The six applications are APP1 (Application 1), APP2, APP3, APP4, APP5, and APP6. Therefore, the user of the mobile phone can tap the icon of any one of the above six applications to enter the display interface of the masking layer.

In an example embodiment, in the above step S204 of the present disclosure, the unlocking instruction of the masking layer may be preset by the manufacturer or the user of the terminal. For example, the user can set the unlocking instruction of the masking layer as tapping, swiping, or long press. For different applications, the masking layer displayed on the screen may be different. Therefore, the unlocking instructions corresponding to different unlocking layers may also be different. For example, a user of a terminal sets different masking layers and unlocking instructions in advance for different types of applications on the terminal. For example, the masking layer of the game-type application on the terminal is a monochrome layer. When opening the game-type application, the user needs to perform a long press on the monochrome layer to generate the unlocking instruction. The masking layer of the social-type of the application on the terminal is a frosted glass layer. When opening the social application, the user needs to conduct regularly sliding operation on the frosted glass layer to generate the unlocking instruction.

In an example embodiment, in the above step S206 of the present disclosure, in a case where the unlocking instruction matches the preset instruction, the display interface of the masking layer can be switched to the display interface of the general layer on the screen of the terminal, and then switched to the display interface of the application. In addition, the display interface of the masking layer can be directly switched to the display interface of the application on the screen of the terminal.

In an example embodiment, FIG. 2(*c*) is a schematic diagram of another example scanning vulnerability detection method according to an example embodiment of the present disclosure. As shown in FIG. 2(*c*), the terminal may be a mobile phone. The display interface of the mobile phone screen is switched from the masking layer to the general layer. For example, the masking layer can be a frosted glass layer. The general layer can be a high-definition glass layer.

In an example embodiment, FIG. 2(*d*) is a schematic diagram of another example vulnerability detection method according to an example embodiment of the present disclosure. As shown in FIG. 2(*d*), the terminal can be a mobile phone. The display interface of the mobile phone screen is switched from the masking layer to the general layer. For example, the application can be a notepad. At least the existing "Item 1", "Item 2", and "Item 3" are displayed on the display interface of the application.

Figure 3A:
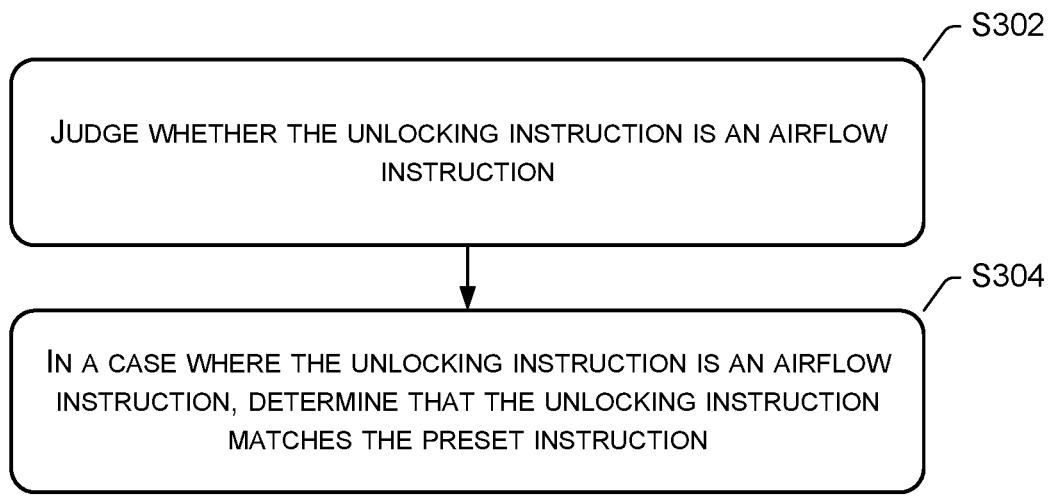
FIG. 3(a) is a schematic flowchart of another example method for unlocking a terminal according to an example embodiment of the present disclosure.

In an example embodiment, FIG. 3(a) is a schematic flowchart of another example method for unlocking a terminal according to an example embodiment of the present disclosure. As shown in FIG. 3(a), after the unlocking instruction input based on the masking layer is received, the method further includes:

Step S302: judging whether the unlocking instruction is an airflow instruction.

In an example embodiment, in the above step S302 of the present disclosure, the user of the terminal can blow at the inlet of the microphone of the terminal, causing the terminal to generate an airflow instruction. Such an operation manner is a special voice-activated operation manner.

Figure 3B:
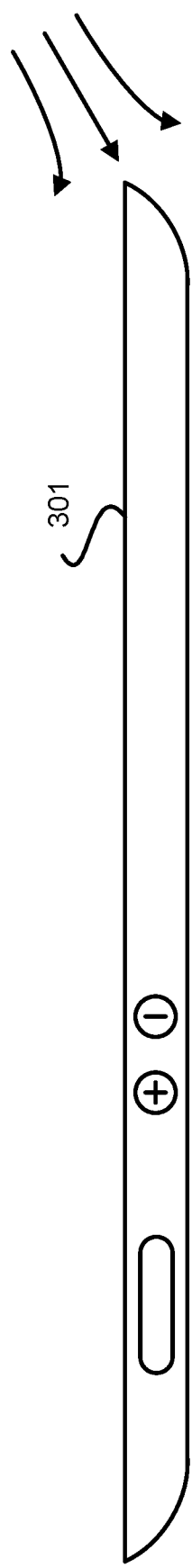
FIG. 3(b) is a schematic diagram of yet another example method for unlocking a terminal according to an example embodiment of the present disclosure.

In an example embodiment, FIG. 3(b) is a schematic diagram of yet another example method for unlocking a terminal according to an example embodiment of the present disclosure. As shown in FIG. 3(b), the terminal can be a mobile phone 301. The user can blow at the microphone of the mobile phone 301. When the airflow flows to the inlet of the microphone of the mobile phone 301, the terminal is triggered to generate an airflow instruction.

Step S304: in a case where the unlocking instruction is an airflow instruction, determining that the unlocking instruction matches the preset instruction.

In an example embodiment, in the above step S304 of the present disclosure, in order to improve the timeliness and accuracy of the airflow instruction generated by the terminal, the sensitivity of the microphone on the terminal can be adjusted, thereby avoiding the generation of an erroneous instruction.

Figure 4:
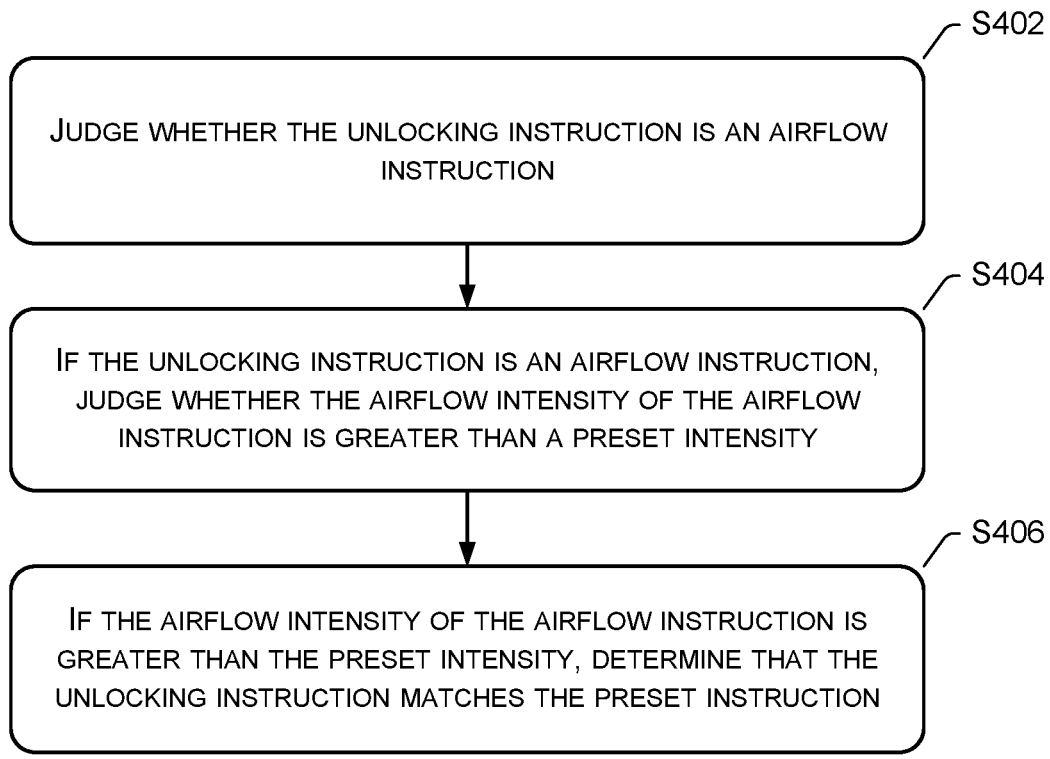
FIG. 4 is a schematic flowchart of yet another example method for unlocking a terminal according to an example embodiment of the present disclosure.

In an example embodiment, FIG. 4 is a schematic flowchart of yet another example method for unlocking a terminal according to an example embodiment of the present disclosure. As shown in FIG. 4, after the unlocking instruction input based on the masking layer is received, the method further includes:

Step S402: judging whether the unlocking instruction is an airflow instruction.

In an example embodiment, in the above step S402 of the present disclosure, the judgment of whether the unlocking instruction is an airflow instruction can be accomplished by a sound sensor and a sound processing chip mounted on the terminal.

Step S404: if the unlocking instruction is an airflow instruction, judging whether the airflow intensity of the airflow instruction is greater than a preset intensity.

In an example embodiment, in the above step S404 of the present disclosure, the preset intensity can be preset by the user of the terminal depending on the environment or the conditions in which the terminal is used. The preset intensity may vary under different use environment. For example, when the use environment of the terminal is a noisy public area, the preset intensity is high. When the use environment of the terminal is a quiet private area, the preset intensity is lower.

Step S406: if the airflow intensity of the airflow instruction is greater than the preset intensity, determining that the unlocking instruction matches the preset instruction.

In an example embodiment, in the above step S406 of the present disclosure, since the terminal may receive multiple airflow instructions at the same time, the terminal needs to identify multiple airflow instructions to determine which airflow instruction is generated based on the user's operation on the terminal. The terminal can rely on the cooperation of its own sound sensor, pressure sensor, gravity sensor, and other sensors to determine the airflow instruction generated by the user's operation on the terminal through the recognition algorithm.

Figure 5A:
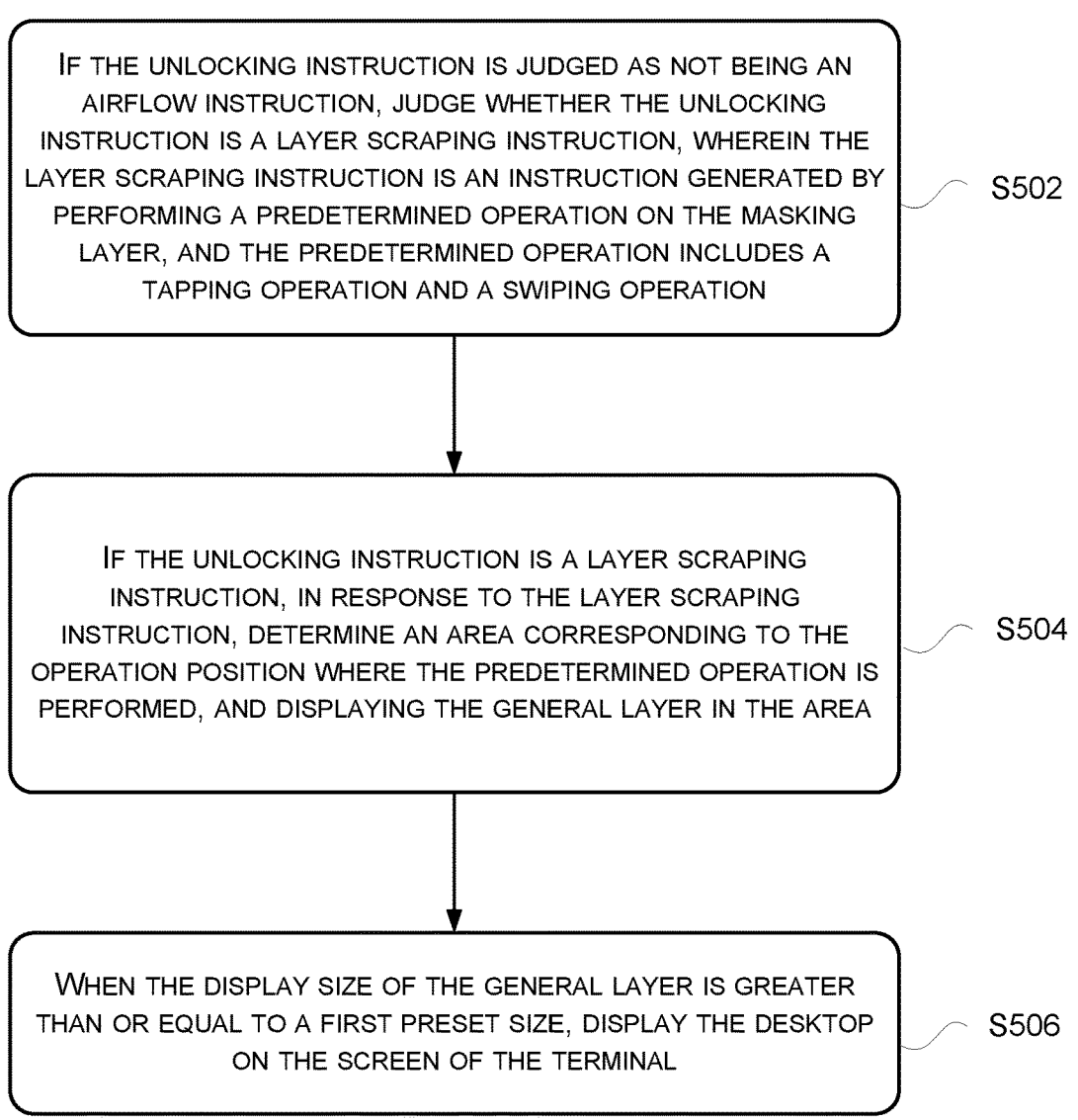
FIG. 5(a) is a schematic flowchart of yet another example method for unlocking a terminal according to an example embodiment of the present disclosure.

In an example embodiment, FIG. 5(a) is a schematic flowchart of yet another example method for unlocking a terminal according to an example embodiment of the present disclosure. As shown in FIG. 5(a), after judging whether the unlocking instruction is an airflow instruction, the method further includes:

Step S502: if the unlocking instruction is judged as not being an airflow instruction, judging whether the unlocking instruction is a layer scraping instruction, wherein the layer scraping instruction is an instruction generated by performing a predetermined operation on the masking layer, and the predetermined operation includes a tapping operation and a swiping operation.

In an example embodiment, in the above step S502 of the present disclosure, the layer scraping can be interpreted as an operation that destroys the camouflage effect of the masking layer, which somewhat reduces the concealment of the application.

Figure 5B:
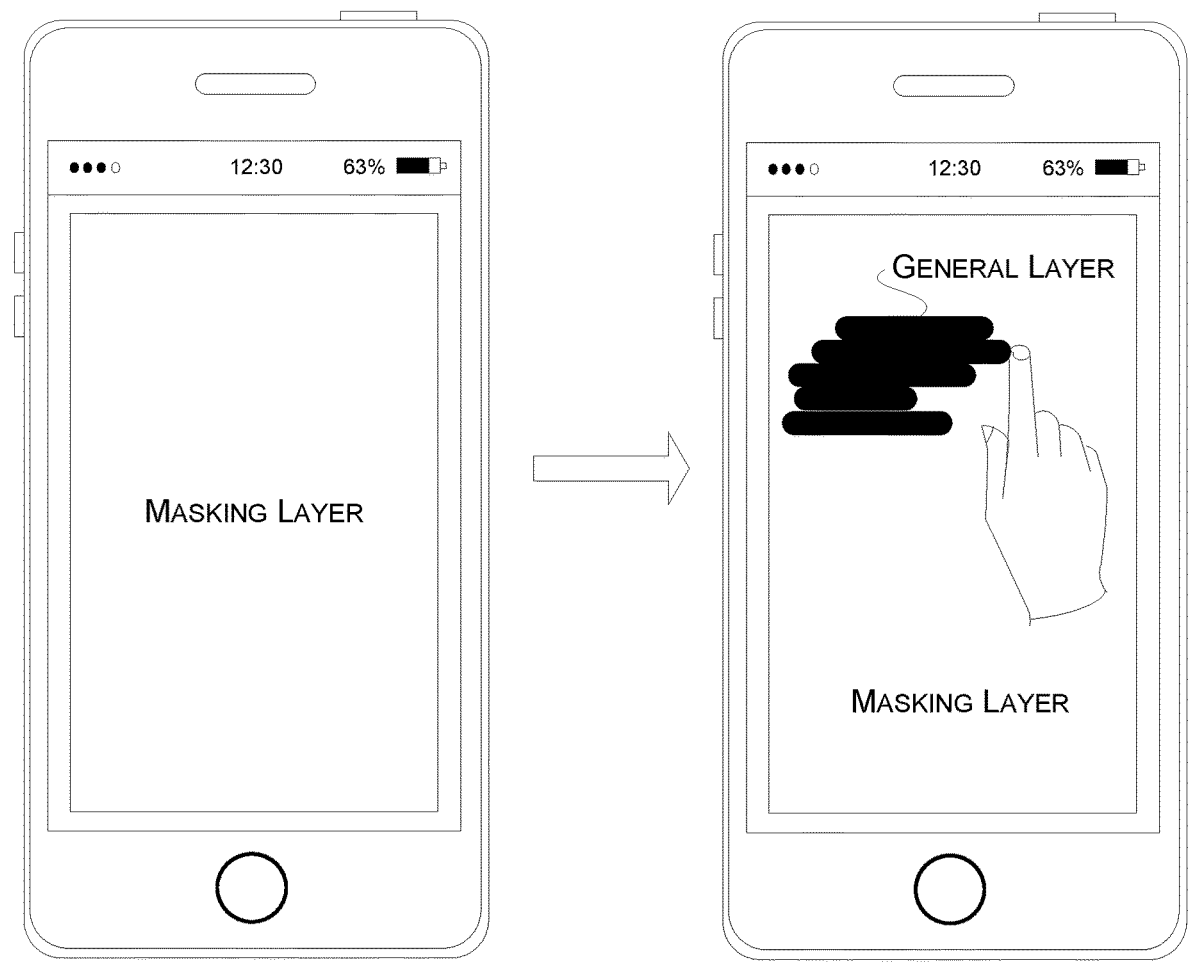
FIG. 5(b) is a schematic diagram of yet another example method for unlocking a terminal according to an example embodiment of the present disclosure.

In an example embodiment, FIG. 5(b) is a schematic diagram of yet another example method for unlocking a terminal according to an example embodiment of the present disclosure. As shown in FIG. 5(b), the terminal can be a mobile phone. The user can simultaneously display the general layer on the mobile phone screen by swiping the masking layer currently being displayed on the mobile phone screen. The display area of the general layer is in positional alignment with the swiping track of the user's mobile phone. It should be noted that the general layer in FIG. 5(b) is highlighted displayed compared to the masking layer, with the purpose is of distinguishing a general layer from a masking layer.

Step S504: if the unlocking instruction is a layer scraping instruction, in response to the layer scraping instruction, determining an area corresponding to the operation position where the predetermined operation is performed, and displaying the general layer in the area.

In an example embodiment, in the above step S504 of the present disclosure, the general layer may be partially displayed. The area of the general layer may be the same as the first operating area of the operator or may be slightly larger than the first operating area. The first operating area is referred to as the sum of the area in which the surface of the operator's finger contacts the mobile phone screen when the user swipes on the mobile phone screen.

Step S506: when the display size of the general layer is greater than or equal to a first preset size, displaying the desktop on the screen of the terminal.

In an example embodiment, in the above step S506 of the present disclosure, the first preset size can be set in advance by the user. For example, if a terminal is a mobile phone with a 5.5-inch screen, the first preset size can be set to 3 inches in any direction on the mobile phone screen. When the general layer has a display size of no less than 3 inches in a certain direction, the desktop can be displayed on the screen of the mobile phone. The first preset size can also be an area. As another example, the first preset size is 5 square inches. When the area of the general layer is greater than or equal to 5 square inches, the desktop can be displayed on the screen of the mobile phone.

Figure 5C:
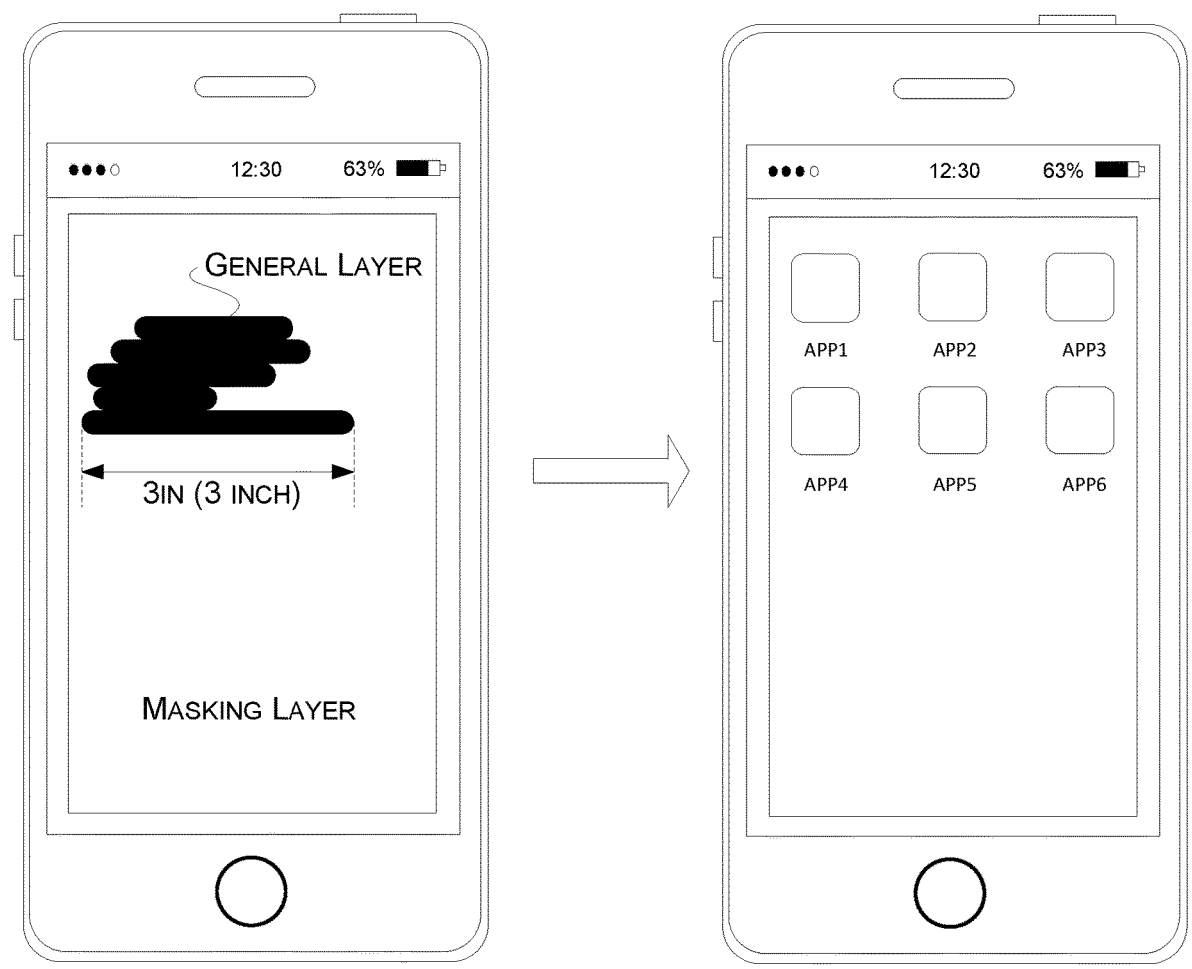
FIG. 5 (c) is a schematic diagram of yet another example method for unlocking a terminal according to an example embodiment of the present disclosure.

In an example embodiment, FIG. 5(c) is a schematic diagram of yet another example method for unlocking a terminal according to an example embodiment of the present disclosure. As shown in FIG. 5(c), the terminal is a mobile phone. When the general layer has a display size of 3 inches in the horizontal direction, the desktop is displayed on the mobile phone screen.

Figure 6A:
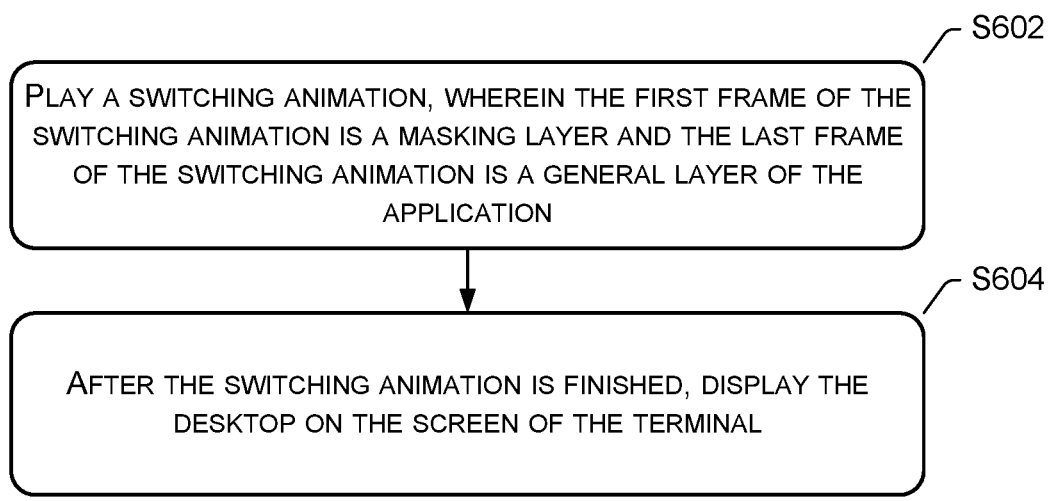
FIG. 6(a) is a schematic flowchart of yet another example method for unlocking a terminal according to an example embodiment of the present disclosure.
Figure 6B:
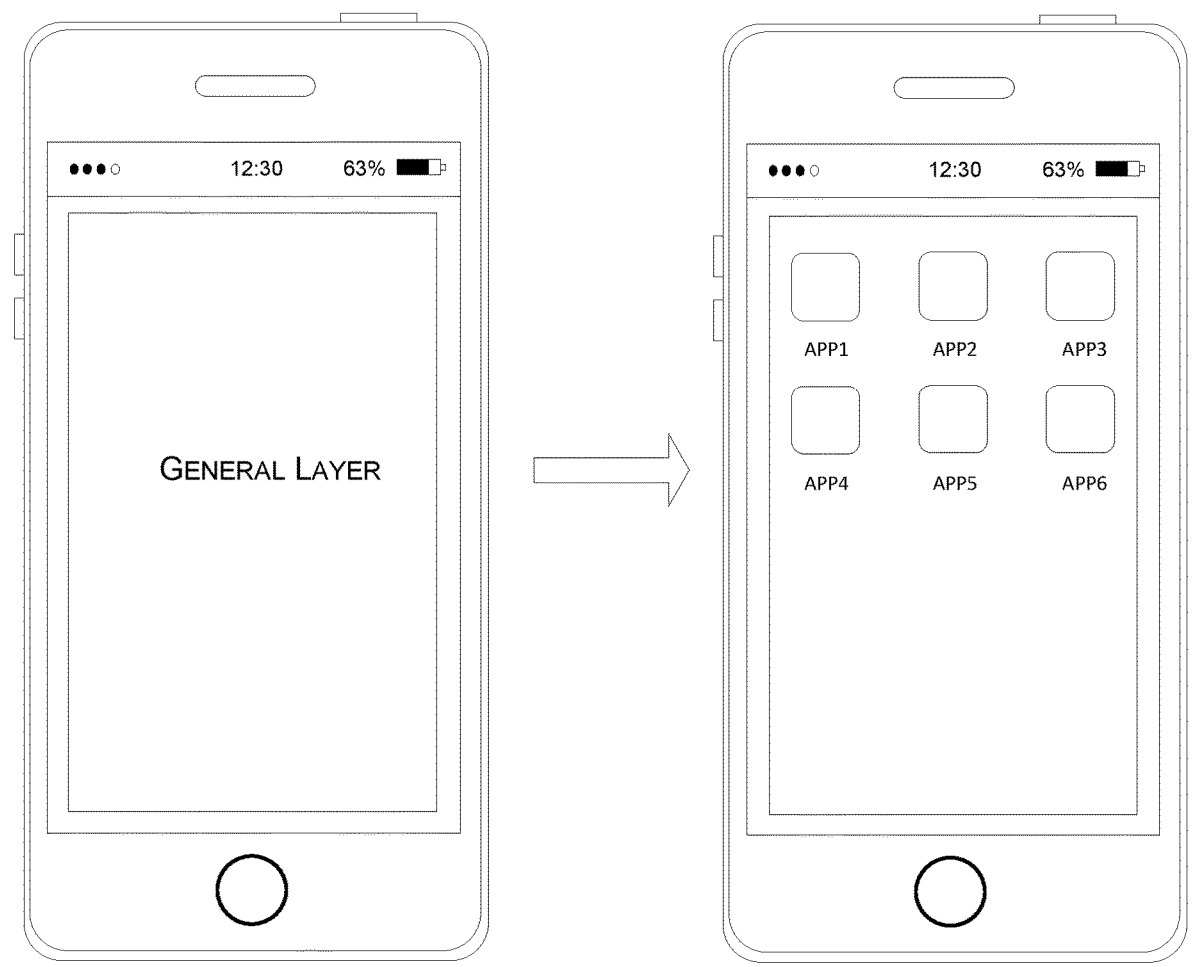
FIG. 6(b) is a schematic diagram of yet another example method for unlocking a terminal according to an example embodiment of the present disclosure.

In an example embodiment, FIG. 6(*a*) is a schematic flowchart of yet another example method for unlocking a terminal according to an example embodiment of the present disclosure. As shown in FIG. 6(*a*), displaying the desktop on the screen of the terminal includes:

Step S602: playing a switching animation, wherein the first frame of the switching animation is a masking layer and the last frame of the switching animation is a general layer of the application.

In an example embodiment, in the above step S902 of the present disclosure, the animation duration of the switching animation can be preset by the user of the terminal. Generally, a relatively short animation duration can be set to enhance the convenience, and a relatively long animation duration can be set to enhance the concealment.

Step S604: after the switching animation is finished, displaying the desktop on the screen of the terminal.

In an example embodiment, in the above step S604 of the present disclosure, after the switching animation is finished, the screen of the terminal can directly display the desktop, or continuously display the last frame of the switching animation, that is, the general layer of the application. When the general layer of the application is continuously displayed, the user can tap on the general layer of the application to display the desktop.

In an example embodiment, FIG. 6(*b*) is a schematic flowchart of yet another example method for unlocking a terminal according to an example embodiment of the present disclosure. As shown in FIG. 6(*b*), the terminal is a mobile phone, the current display interface of the mobile phone screen is the last frame of the switching animation, that is, the general layer of the application. The user needs to tap on the general layer of the application so that the mobile phone screen displays the desktop.

Figure 7A:
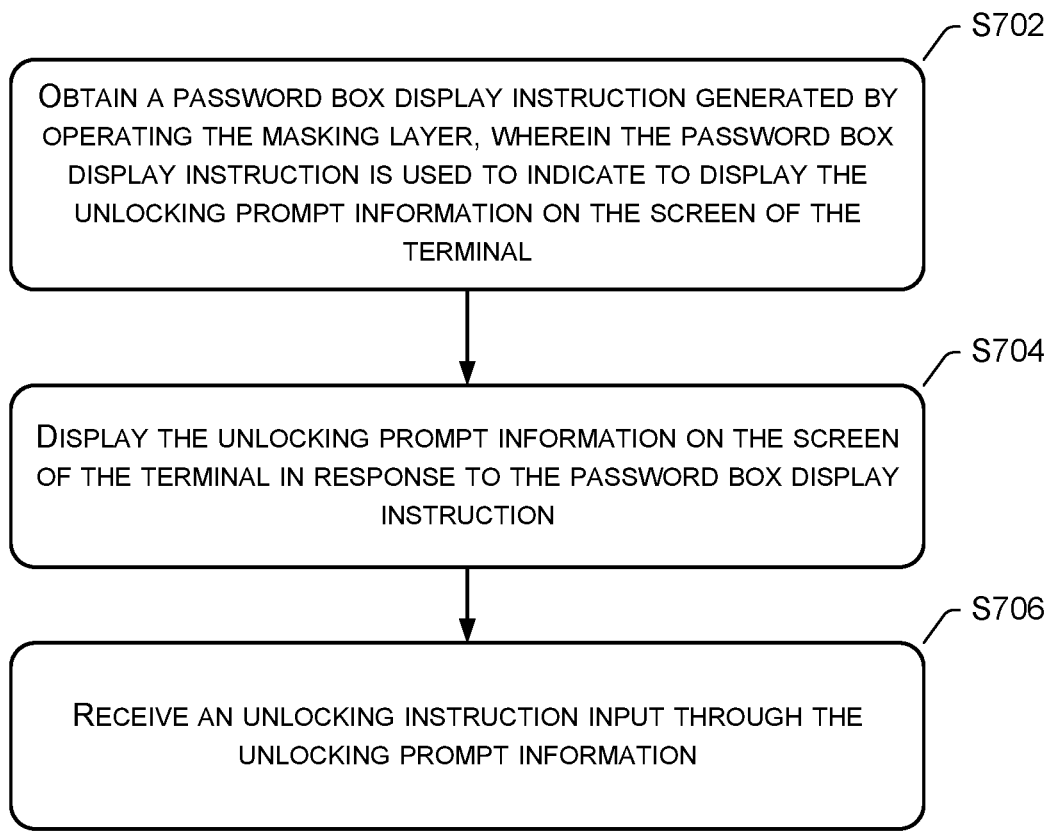
FIG. 7(a) is a schematic flowchart of yet another example method for unlocking a terminal according to an example embodiment of the present disclosure.
Figure 7B:
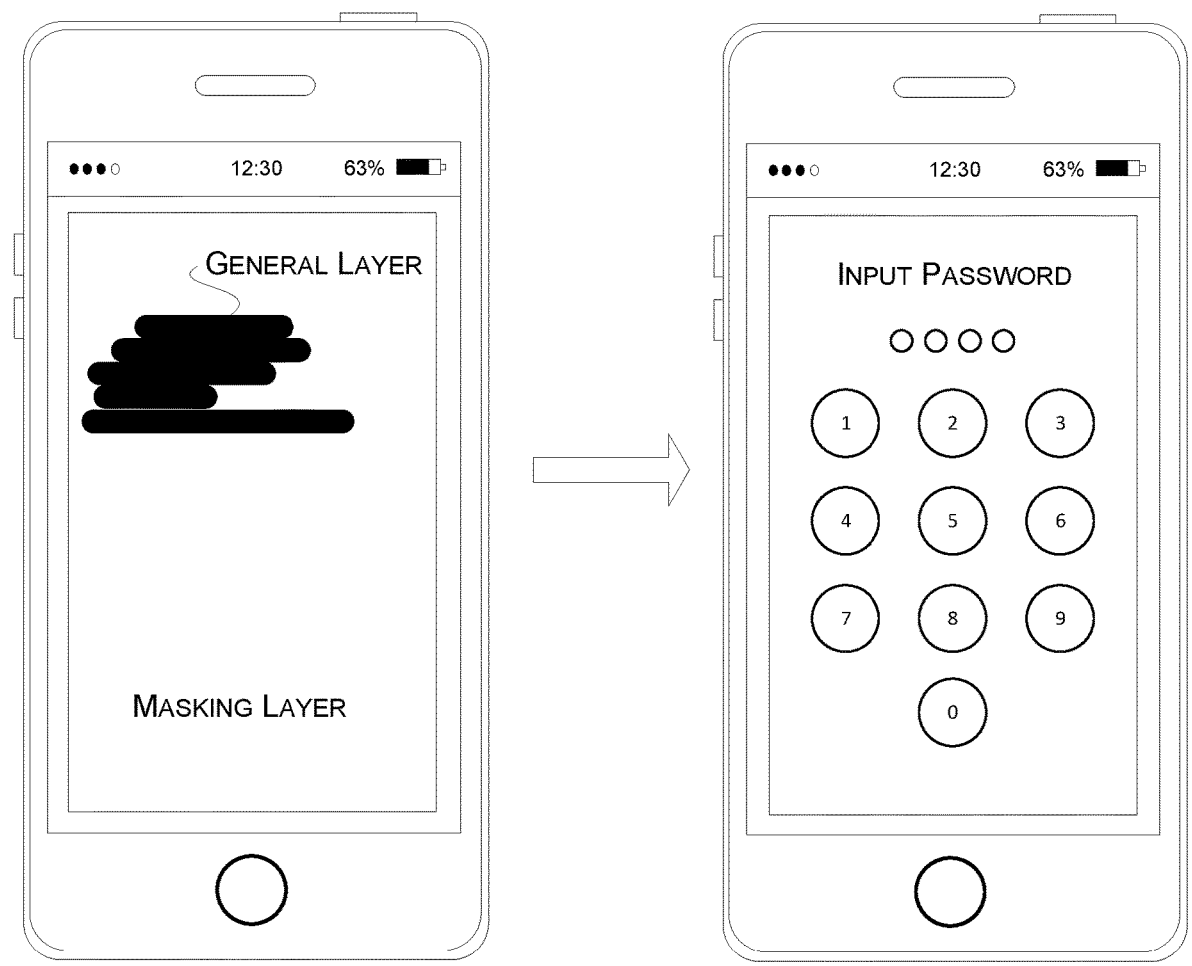
FIG. 7(b) is a schematic diagram of yet another example method for unlocking a terminal according to an example embodiment of the present disclosure.

In an example embodiment, FIG. 7(*a*) is a schematic flowchart of yet another example method for unlocking a terminal according to an example embodiment of the present disclosure. As shown in FIG. 7(*a*), receiving the unlocking instruction input based on the masking layer comprises:

Step S702: obtaining a password box display instruction generated by operating the masking layer, wherein the password box display instruction is used to indicate to display the unlocking prompt information on the screen of the terminal.

In an example embodiment, in the above step S702 of the present disclosure, the unlocking prompt information may refer to which unlocking manner is used to unlock. The unlocking manner may include password unlocking, graphic sliding unlocking, fingerprint unlocking, and voice unlocking.

Step S704: displaying the unlocking prompt information on the screen of the terminal in response to the password box display instruction.

In an example embodiment, in the above step S704 of the present disclosure, the unlocking prompt information may be a character, a graphic, a symbol, or the like. For example, if the unlocking prompt information is "fingerprint unlocking", the unlocking instruction needs to be generated in a fingerprint unlocking manner.

Step S706: receiving an unlocking instruction input through the unlocking prompt information.

In an example embodiment, in the above step S706 of the present disclosure, the unlocking prompt information has a correspondence with the unlocking instruction, and the correspondence can be preset by the user of the terminal.

In an example embodiment, FIG. 7(*b*) is a schematic flowchart of yet another example method for unlocking a terminal according to an example embodiment of the present disclosure. As shown in FIG. 7(*b*), the unlocking prompt information is the text "Input Password", and the unlocking instruction can be generated by inputting a four-digit password through the numeric keypad. It should be noted that the display size of the general layer in FIG. 7(*b*) is the area of the general layer, and the unit of the general layer may be square centimeters or square inches.

Figure 8A:
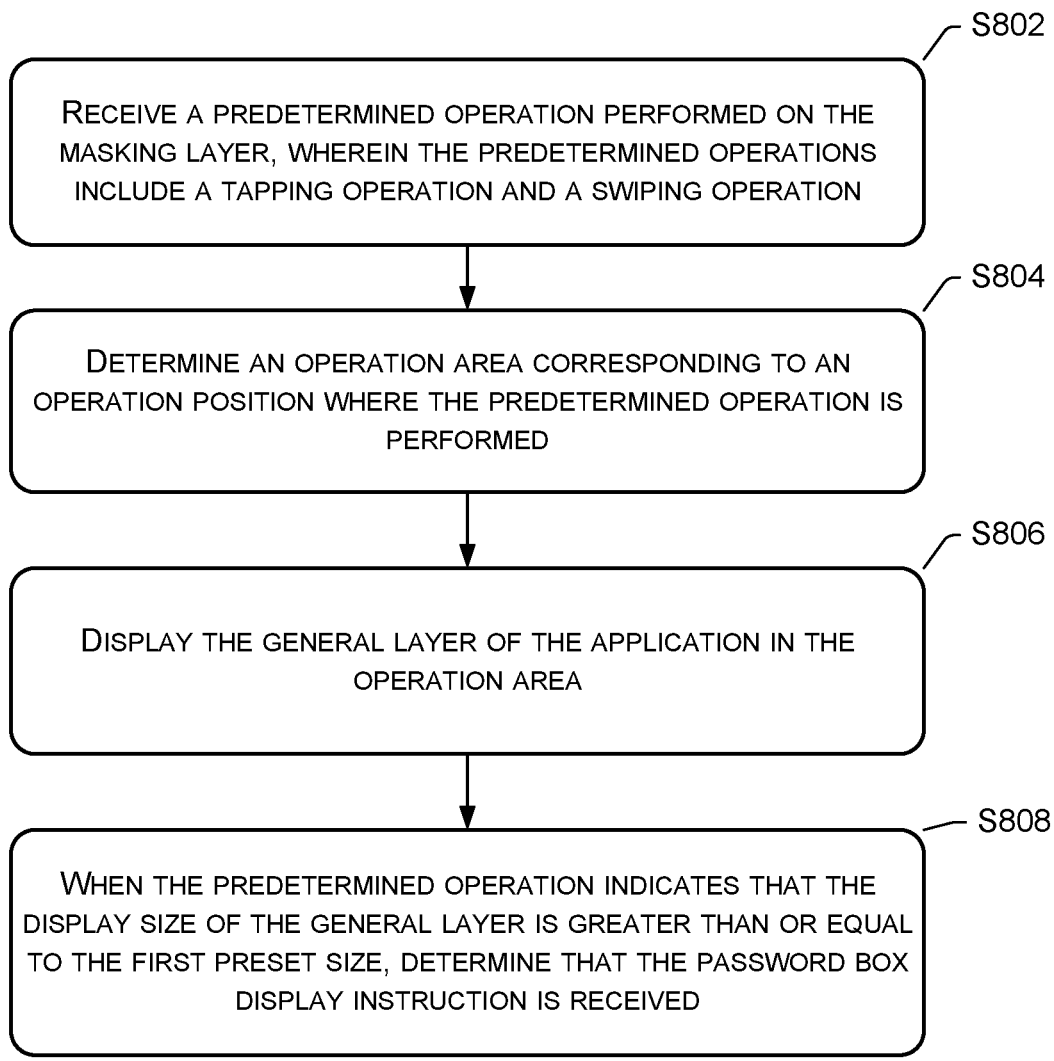
FIG. 8(a) is a schematic flowchart of yet another example method for unlocking a terminal according to an example embodiment of the present disclosure.
Figure 8B:
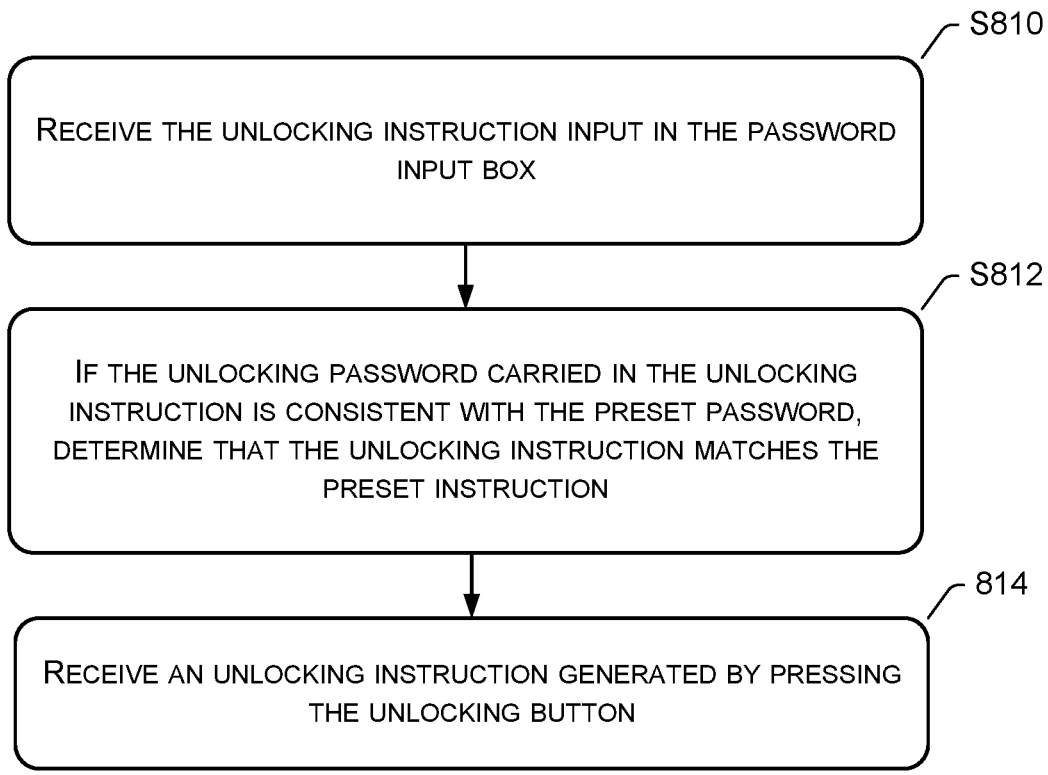
FIG. 8(b) is a schematic flowchart of yet another example method for unlocking a terminal according to an example embodiment of the present disclosure.

In an example embodiment, FIG. 8 is a schematic flowchart of yet another example method for unlocking a terminal according to an example embodiment of the present disclosure. As shown in FIG. 8, obtaining a password box display instruction generated by operating the masking layer comprises:

Step S802: receiving a predetermined operation performed on the masking layer, wherein the predetermined operations include a tapping operation and a swiping operation;

Step S804: determining an operation area corresponding to an operation position where the predetermined operation is performed;

Step S806: displaying the general layer of the application in the operation area;

Step S808: when the predetermined operation indicates that the display size of the general layer is greater than or equal to the first preset size, determining that the password box display instruction is received.

Steps S802 to S808 may be performed by a CPU (Central Processing Unit) and a GPU (Graphics Processing Unit) of the terminal. The first preset size can be preset by the user. The operation area refers to a finger swiping area that is already present on the mobile phone screen after the user's finger swipes on the mobile phone screen.

In an example embodiment, in a case where the unlocking prompt information is a password input box, receiving the unlocking instruction input through the unlocking prompt information includes:

Step S810: receiving the unlocking instruction input in the password input box.

In an example embodiment, in the above step S810 of the present disclosure, the password input box can display the number of passwords that need to be input.

In an example embodiment, after the unlocking instruction input in password input box is received, the method further includes:

Step S812: if the unlocking password carried in the unlocking instruction is consistent with the preset password, determining that the unlocking instruction matches the preset instruction.

In an example embodiment, in the above step S812 of the present disclosure, the preset password may be an arrangement of characters, numbers, and letters.

In an example embodiment, in a case where the unlocking prompt information is an unlocking button, receiving the unlocking instruction input through the unlocking prompt information includes:

Step S814: receiving an unlocking instruction generated by pressing the unlocking button.

In an example embodiment, in the above step S814 of the present disclosure, the unlocking button may be a physical button or a virtual button. If the unlock button is a physical button, the manner of generating the unlocking instruction may include fingerprint unlocking.

Figure 9A:
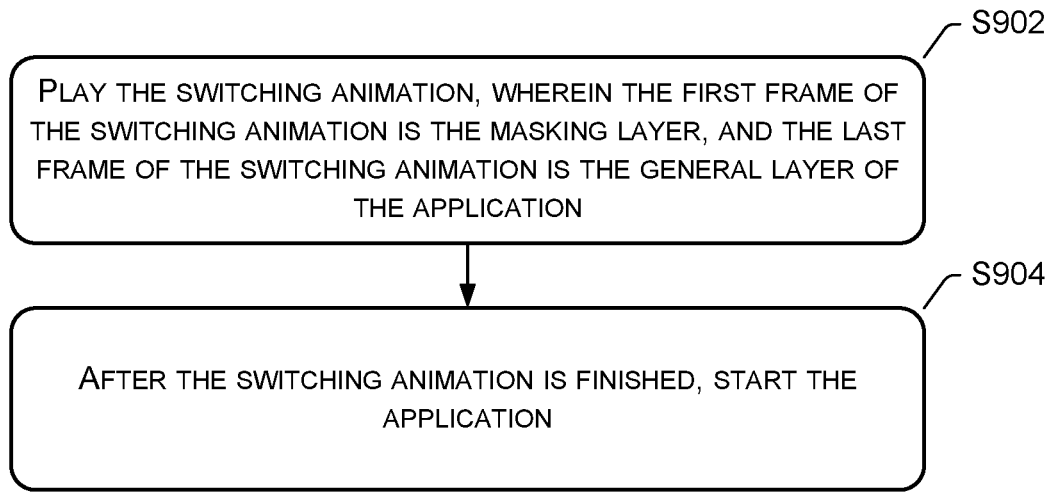
FIG. 9(a) is a schematic flowchart of yet another example method for unlocking a terminal according to an example embodiment of the present disclosure.
Figure 9B:
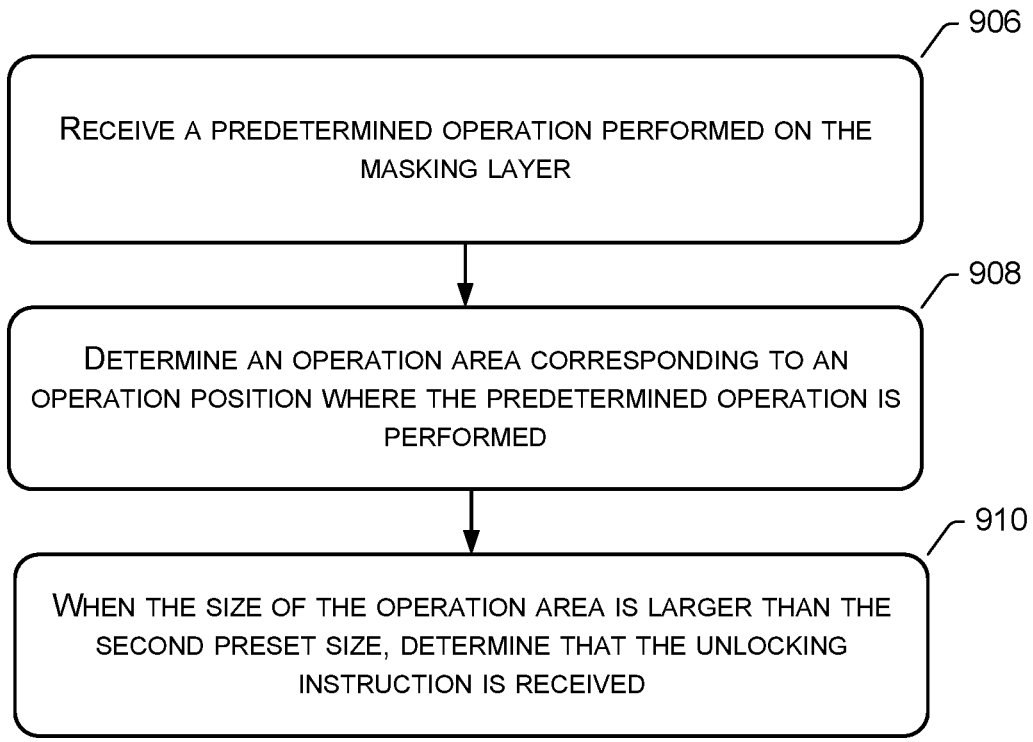
FIG. 9(b) is a schematic flowchart of yet another example method for unlocking a terminal according to an example embodiment of the present disclosure.

In an example embodiment, FIG. 9 is a schematic flowchart of yet another example method for unlocking a terminal according to an example embodiment of the present disclosure. As shown in FIG. 9, starting the application includes:

Step S902: playing the switching animation, wherein the first frame of the switching animation is the masking layer, and the last frame of the switching animation is the general layer of the application.

In an example embodiment, in the above step S902 of the present disclosure, the animation duration of the switching animation can be preset by the user of the terminal. Generally, a relatively short animation duration can be set to enhance the convenience; a relatively long animation duration can be set to enhance the concealment.

Step S904: after the switching animation is finished, starting the application.

In an example embodiment, in the above step S904 of the present disclosure, after the switching animation is finished, the welcome screen or function interface of the application will be displayed on the screen of the terminal. If the user needs to open the next application, the application that has been started can be placed in the background. If this application needs to be switched back again, whether it is necessary to enter the application's welcome interface or function interface through airflow instruction again can be preset by the user.

In an example embodiment, the unlocking instruction input based on the masking layer includes:

Step S906: receiving a predetermined operation performed on the masking layer, wherein the predetermined operation includes a tapping operation and a swiping operation;

Step S908: determining an operation area corresponding to an operation position where the predetermined operation is performed;

Step S910: when the size of the operation area is larger than the second preset size, determining that the unlocking instruction is received.

Steps S906 to S910 may be performed by a CPU (Central Processing Unit) and a GPU (Graphics Processing Unit) of the terminal. The second preset size may be the area of the operation area or the straight length of the operation area in any direction. In this example embodiment, the unlocking instruction may not be a blowing instruction, that is to say, the unlocking instruction generated by the tapping operation, the swiping operation, or other operating manners can also eliminate the masking layer, thereby unlocking the application. It should be noted that when setting the unlocking instruction, the user of the terminal can select any one of the blowing operation, the tapping operation, and the swiping operation to generate the unlocking instruction, and the above three unlocking operations can also be performed cooperatively.

In an example embodiment, the generation time of the airflow instruction on the terminal is not limited to the time before the generation time of the scraping instruction. The airflow instruction can cooperate with the scraping instruction to realize the predetermined operation of the application. For example, after opening a certain application on the terminal, the user can first perform a finger-scraping operation on the masquerading interface of the application. However, this operation does not necessarily cause the terminal to generate a password box to display the instruction, and thus the unlocking prompt information may not appear on the terminal. In addition, when performing the finger-scraping operation on the masquerading interface of the application, the user can blow towards the microphone of the terminal, so that the terminal generates the airflow instruction and the current interface changes to the common interface of the application. It should be noted that before the common interface of the application is displayed on the screen of the terminal, the terminal can generate the blowing instruction at any time according to the user's blowing operation.

It should be noted that, for each of the foregoing method example embodiments, the descriptions are described as a series of combinations of actions for the sake of brevity. However, those skilled in the art should understand that the present disclosure is not limited by the described sequence of actions. Because depending on the present disclosure, some steps can be performed in other orders or simultaneously. In addition, those skilled in the art should also understand that the example embodiments described in the specification are all example embodiments, and the actions and modules involved are not necessarily required by the present disclosure.

Through the description of the above example embodiments, those skilled in the art can clearly understand that the method according to the above example embodiment can be implemented by means of software plus a necessary general hardware platform, and of course, by hardware. However, in many cases, the former is a better implementation. Based on this understanding, the technical solution of the present disclosure or its contribution to the conventional techniques substantially can be embodied in the form of a software product, which is stored in a storage medium (such as ROM/RAM, disk, CD) and includes a number of instructions to enable a terminal device (which can be a mobile phone, computer, server, or network device, etc.) to execute the method described in the respective application.

Second Example Embodiment

Figure 10:
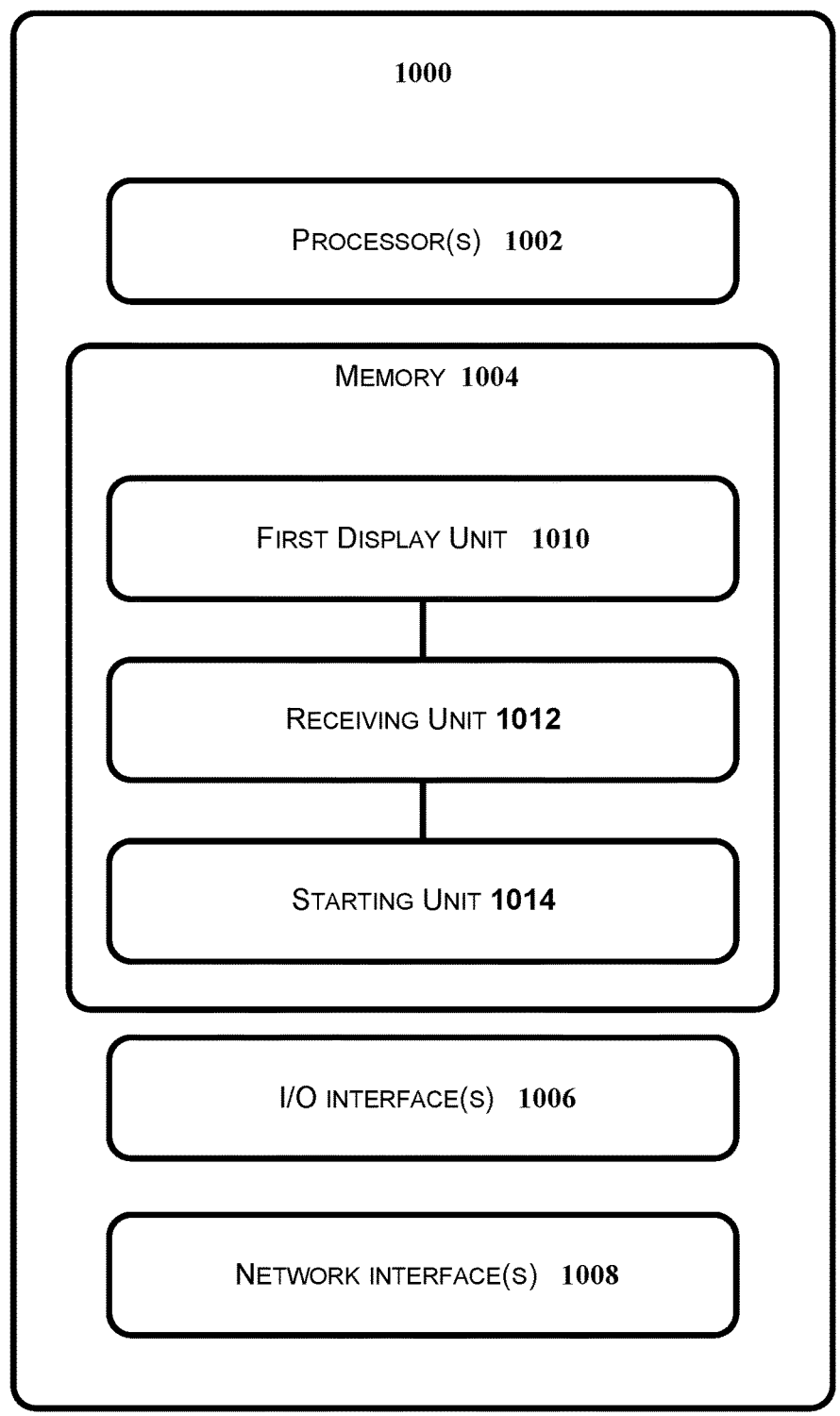
FIG. 10 is a structural schematic diagram of an example device for unlocking a terminal according to an example embodiment of the present disclosure.

According to an example embodiment of the present disclosure, a device for unlocking a terminal for implementing the above method for unlocking a terminal is also provided. As shown in FIG. 10, a device 1000 includes one or more processor(s) 1002 or data processing unit(s) and memory 1004. The device 1000 may further include one or more input/output interface(s) 1006 and one or more network interface(s) 1008.

The memory 1004 is an example of computer readable medium. The memory 1004 may store therein a plurality of modules or units including a first display unit 1010, a receiving unit 1012, and a starting unit 1014.

The first display unit 1010 is configured to display a masking layer on a screen of a terminal in a case where a start instruction for starting an application is received. The receiving unit 1012 is configured to receive the unlocking instruction input based on the masking layer. The starting unit 1014 is configured to start the application in a case where the unlocking instruction matches the preset instruction.

It should be noted that the first display unit 1010, the receiving unit 1012, and the starting unit 1014 correspond to steps S202 to S206 in the first example embodiment, and the three units are the same as the examples and application scenarios implemented by the corresponding steps, but they are not limited to the disclosure of the first example embodiment. It should be noted that the above units can be operated as part of the device in the computer terminal 10 provided by the first example embodiment.

Using the above example embodiment of the present disclosure, the purpose of starting the application in a case where the unlocking instruction matches the preset instruction is realized by displaying the masking layer on the screen of the terminal when the start instruction for starting the application is received, and then receiving the unlocking instruction input based on the masking layer. Therefore, the technical effect of enhancing the concealment and diversity of the terminal unlocking method and improving the security of the terminal unlocking method is realized and the technical problem that the terminal unlocking method in the conventional techniques is less secure is solved.

Figure 11:
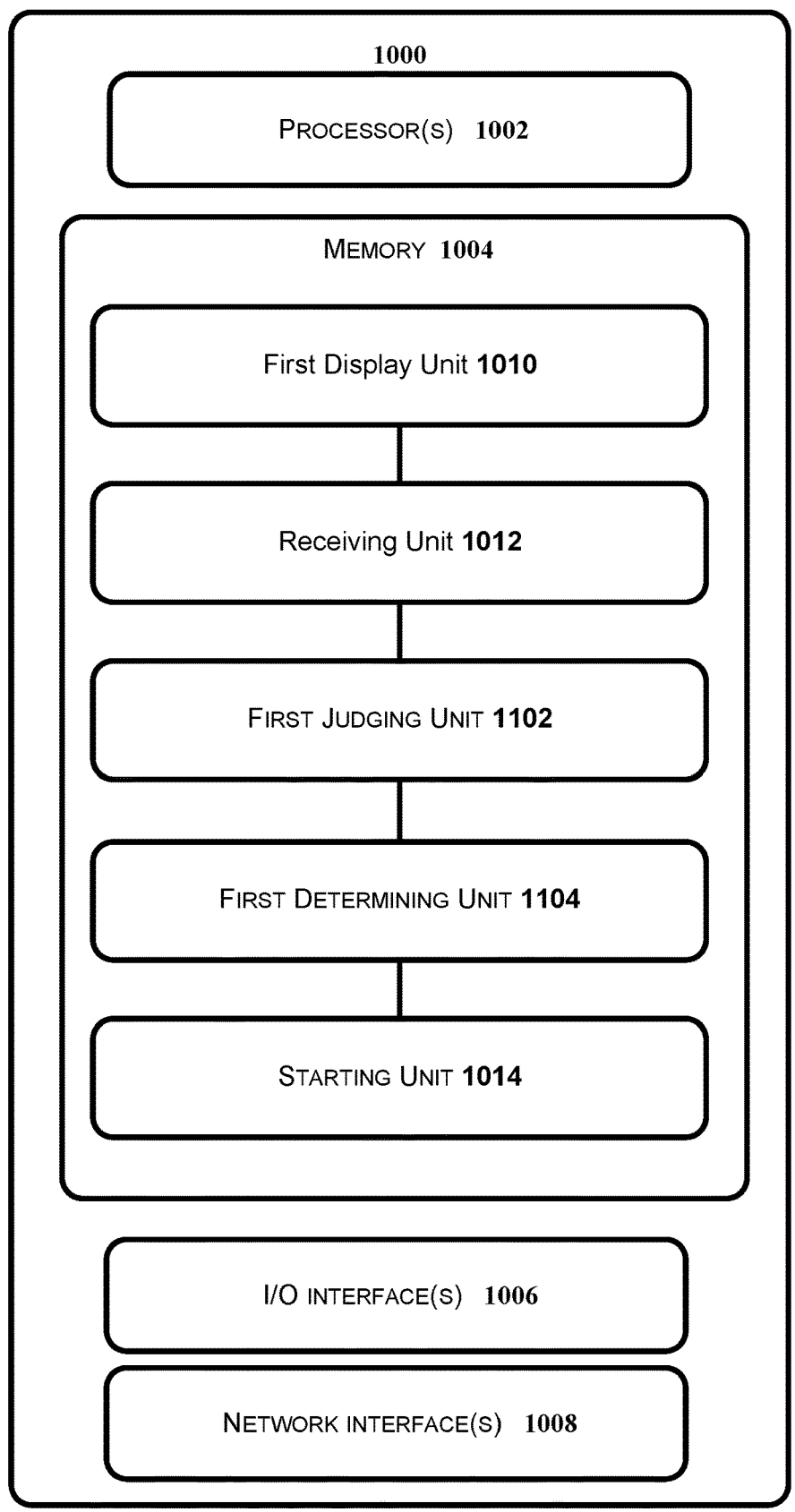
FIG. 11 is a structural schematic diagram of another example device for unlocking a terminal according to an example embodiment of the present disclosure.

In an example embodiment, as shown in FIG. 11, the device 1000 may further include a first judging unit 1102 and a first determining unit 1104 stored in the memory 1004.

The first judging unit 1102 is configured to judge whether the unlocking instruction is an airflow instruction. The first determining unit 1104 is configured to determine that the unlocking instruction matches the preset instruction if the unlocking instruction is an airflow instruction.

It should be noted that the first judging unit 1102 and the first determining unit 1104 correspond to steps S302 to S304 in the first example embodiment, and the two units are the same as the examples and application scenarios implemented by the corresponding steps, but they are not limited to the disclosure of the first example embodiment. It should be noted that the above units can be operated as part of the device in the computer terminal 10 provided by the first example embodiment.

Figure 12:
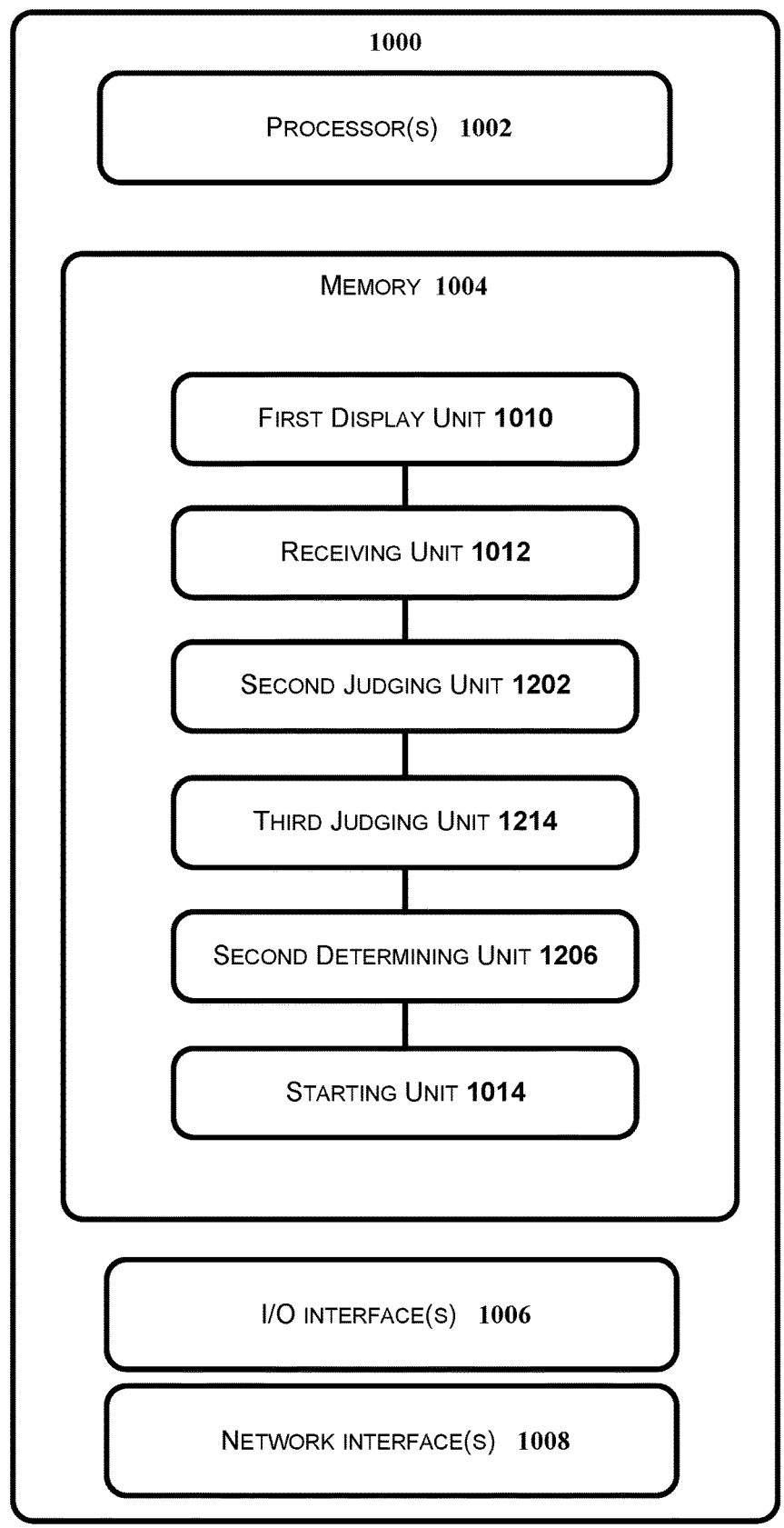
FIG. 12 is a structural schematic diagram of yet another example device for unlocking a terminal according to an example embodiment of the present disclosure.

In an example embodiment, as shown in FIG. 12, the device 1000 may further include a second judging unit 1202, a third judging unit 1204, and a second determining unit 12061206 in the memory 1004 in the memory 1004.

The second judging unit 1202 is configured to judge whether the unlocking instruction is an airflow instruction, and the third judging unit 1204 is configured to judge whether the airflow intensity of the airflow instruction is greater than a preset intensity if the unlocking instruction is an airflow instruction; the second determining unit 1206 is configured to determine the unlocking instruction matches the preset instruction if the airflow intensity of the airflow instruction is greater than the preset intensity.

It should be noted that the second judging unit 1202, the third judging unit 1204, and the second determining unit 1206 correspond to steps S402 to S406 in the first example embodiment, and the three units are the same as the examples and application scenarios implemented by the corresponding steps, but they are not limited to the disclosure of the first example embodiment. It should be noted that the above units can be operated as part of the device in the computer terminal 10 provided by the first example embodiment.

Figure 13A:
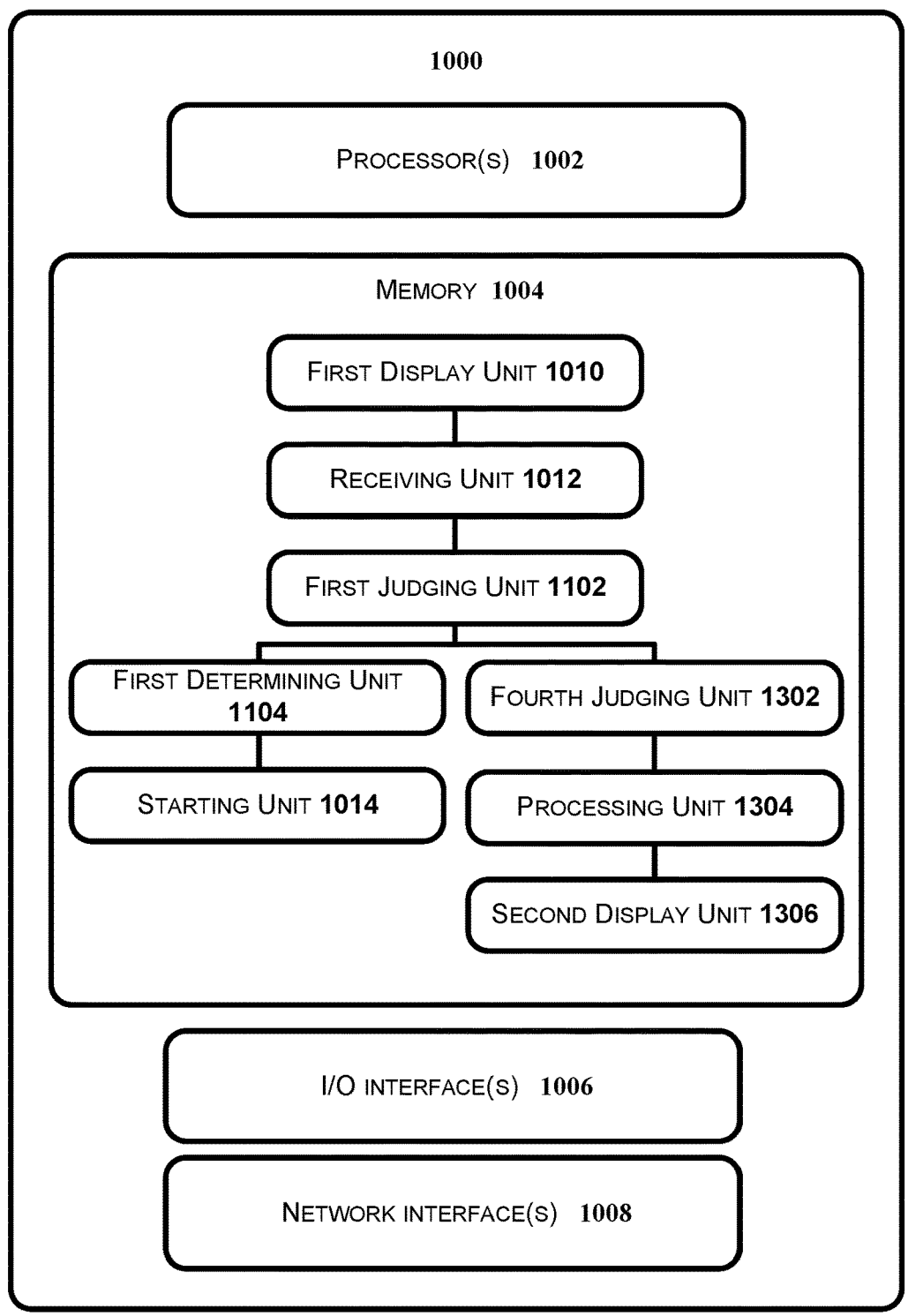
FIG. 13(a) is a structural schematic diagram of yet another example device for unlocking a terminal according to an example embodiment of the present disclosure.
Figure 13B:
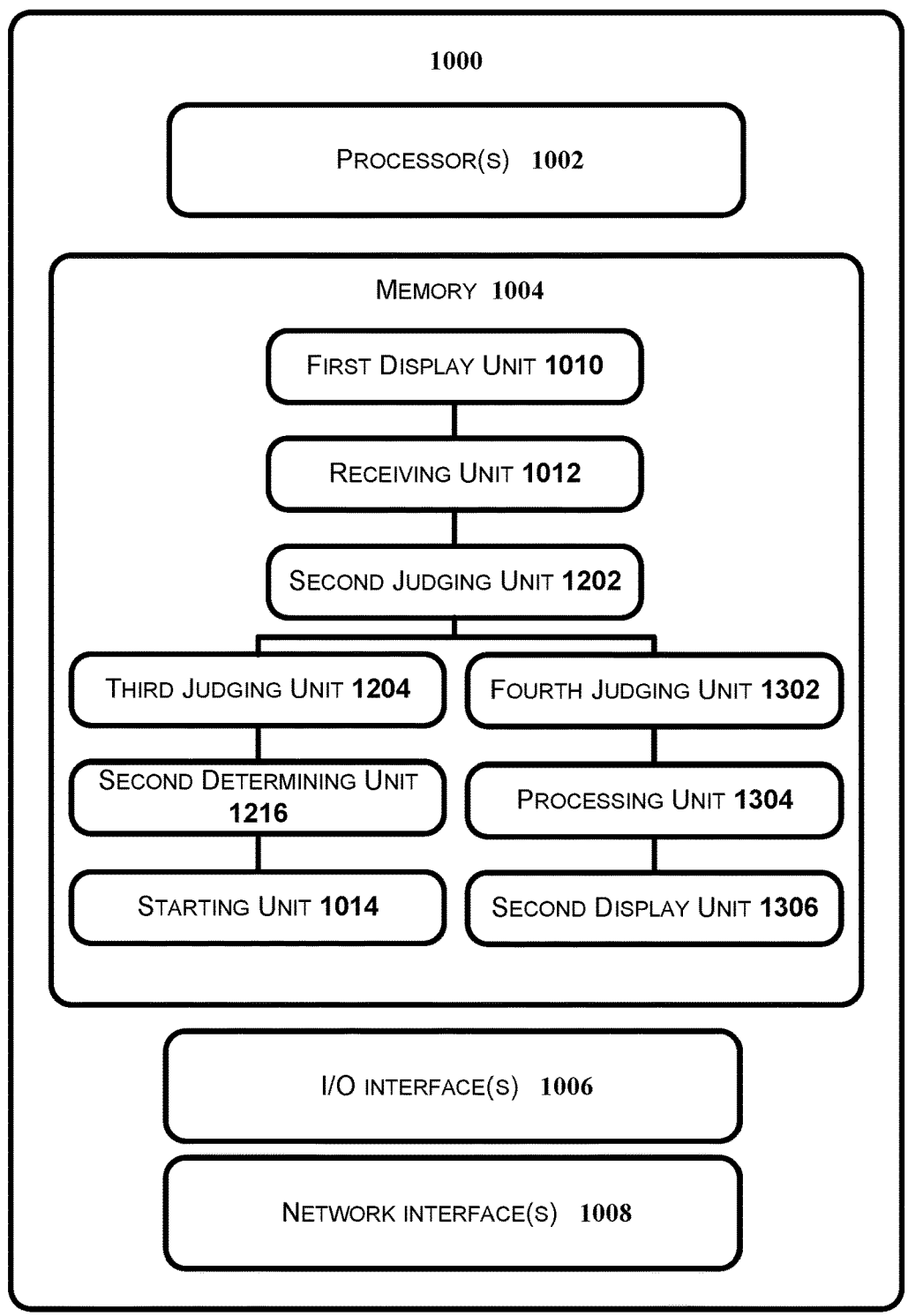
FIG. 13(b) is a structural schematic diagram of yet another example device for unlocking a terminal according to an example embodiment of the present disclosure.

In an example embodiment, as shown in FIG. 13(a) or FIG. 13(b), the device 1000 may further include a fourth judging unit 1302, a processing unit 1304, and a second display unit 1306 in the memory 1004.

The fourth judging unit 1302 is configured to judge whether the unlocking instruction is a layer scraping instruction if the unlocking instruction is not an airflow instruction, wherein the layer scraping instruction is an instruction generated by performing a predetermined operation on the masking layer, wherein the predetermined operation includes a tapping operation and a swiping operation. The processing unit 1304 is configured to, if the unlocking instruction is a layer scraping instruction, determine the area corresponding to the operation position where the predetermined operation is performed, and display the general layer in the area. The second display unit 1306 is configured to display the desktop on the screen of the terminal when the display size of the general layer is greater than or equal to the first preset size.

It should be noted that, the fourth judging unit 1302, the processing unit 1304, and the second display unit 1306 correspond to steps S502 to S506 in the first example embodiment, and the three units are the same as the examples and application scenarios implemented by the corresponding steps, but they are not limited to the disclosure of the first example embodiment. It should be noted that the above units can be operated as part of the device in the computer terminal 10 provided by the first example embodiment.

Figure 14A:
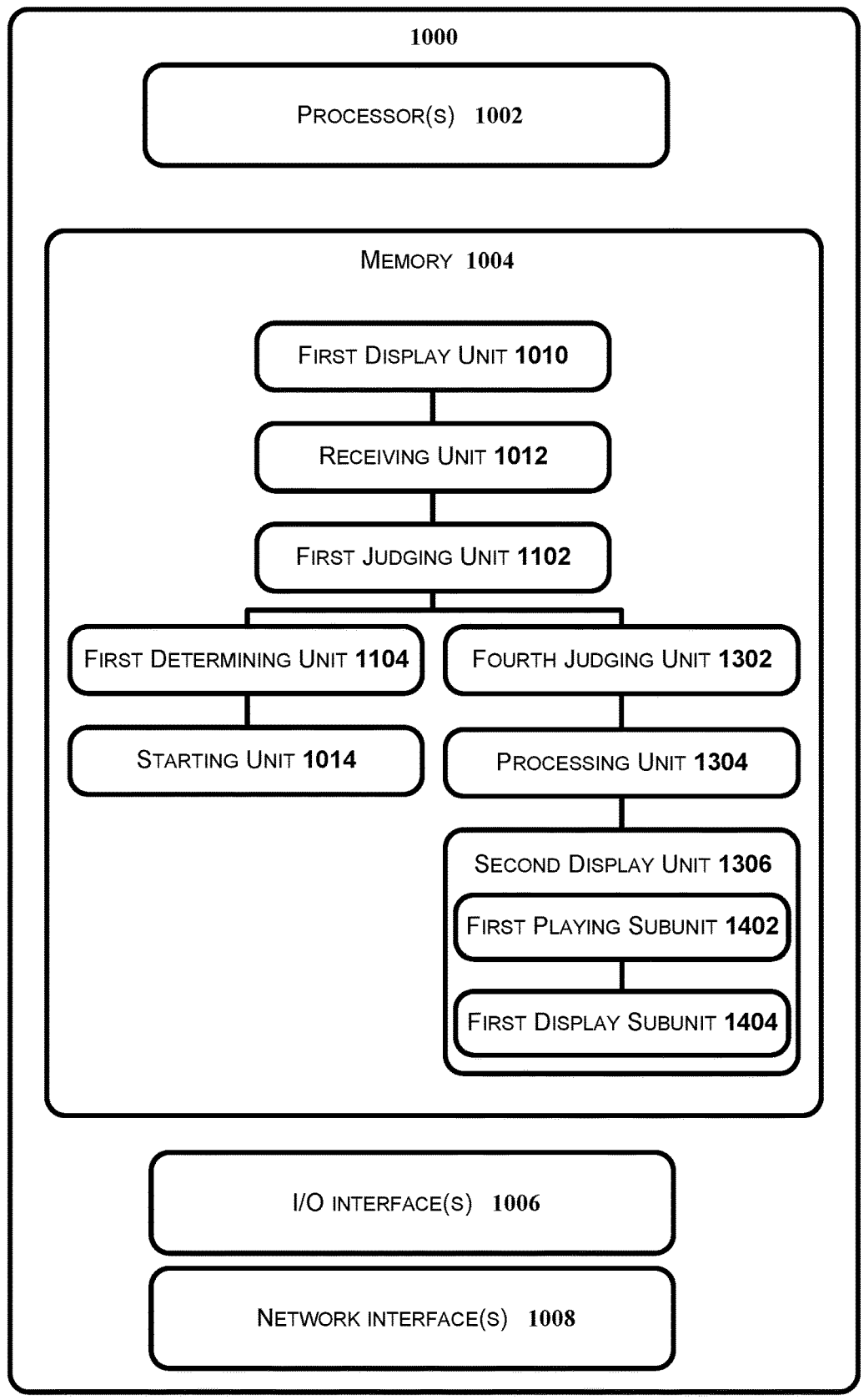
FIG. 14(a) is a structural schematic diagram of yet another example device for unlocking a terminal according to an example embodiment of the present disclosure.
Figure 14B:
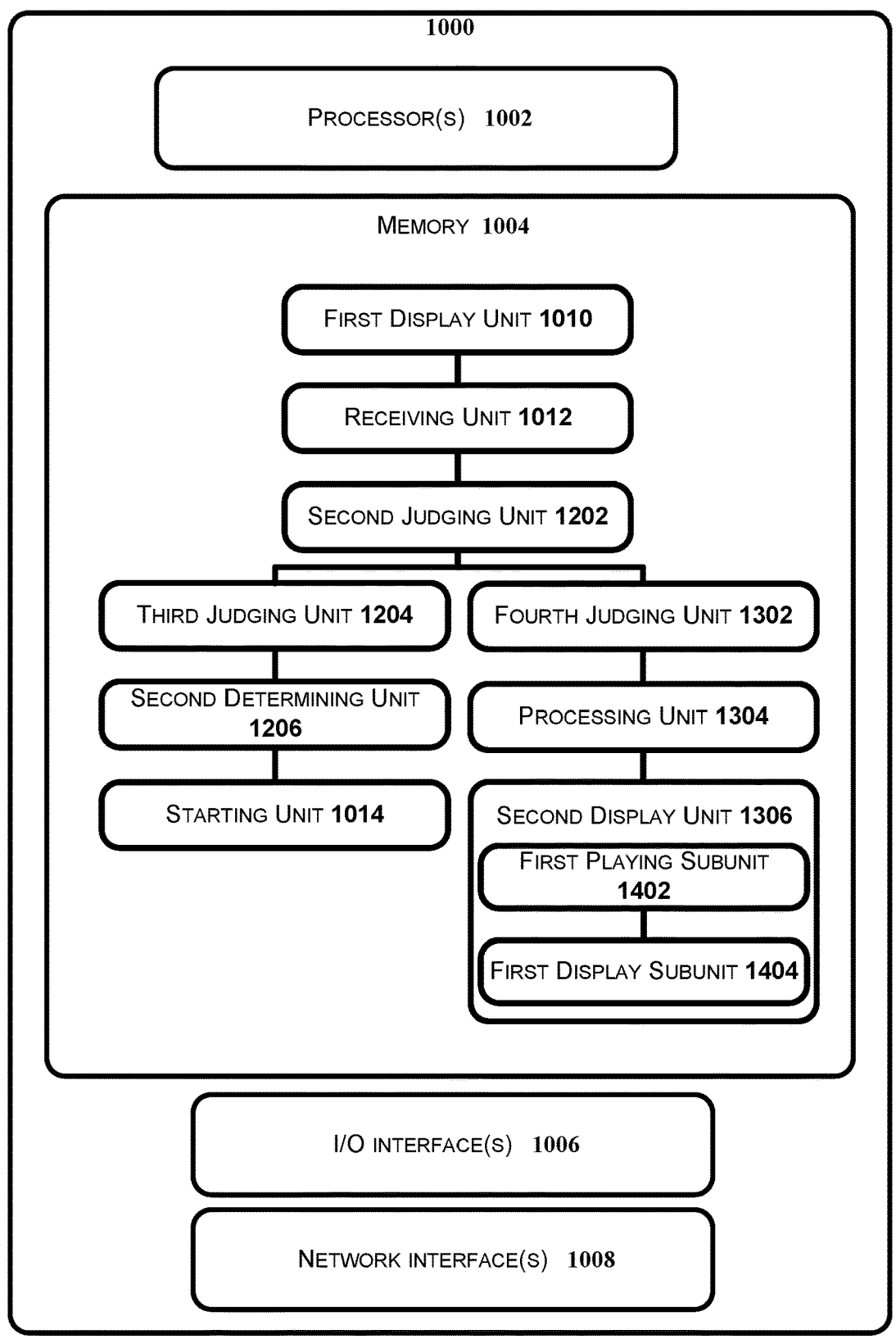
FIG. 14(b) is a structural schematic diagram of yet another example device for unlocking a terminal according to an example embodiment of the present disclosure.

In an example embodiment, as shown in FIG. 14(a) or FIG. 14(b), the second display unit 1306 may include a first playing subunit 1402 and a first display subunit 1404.

The first playing subunit 1402 is configured to play a switching animation. The first frame of the switching animation is a masking layer, and the last frame of the switching animation is the general layer of the application. The first display subunit 1404 is configured to display the desktop on the screen of the terminal after the switching animation is finished.

It should be noted that the first playing subunit 1402 and the first display subunit 1404 correspond to steps S602 to S604 in the first example embodiment, and the two subunits are the same as the examples and application scenarios implemented by the corresponding steps, but they are not limited to the disclosure of the first example embodiment. It should be noted that the above subunits can be operated as part of the device in the computer terminal 10 provided by the first example embodiment.

Figure 15:
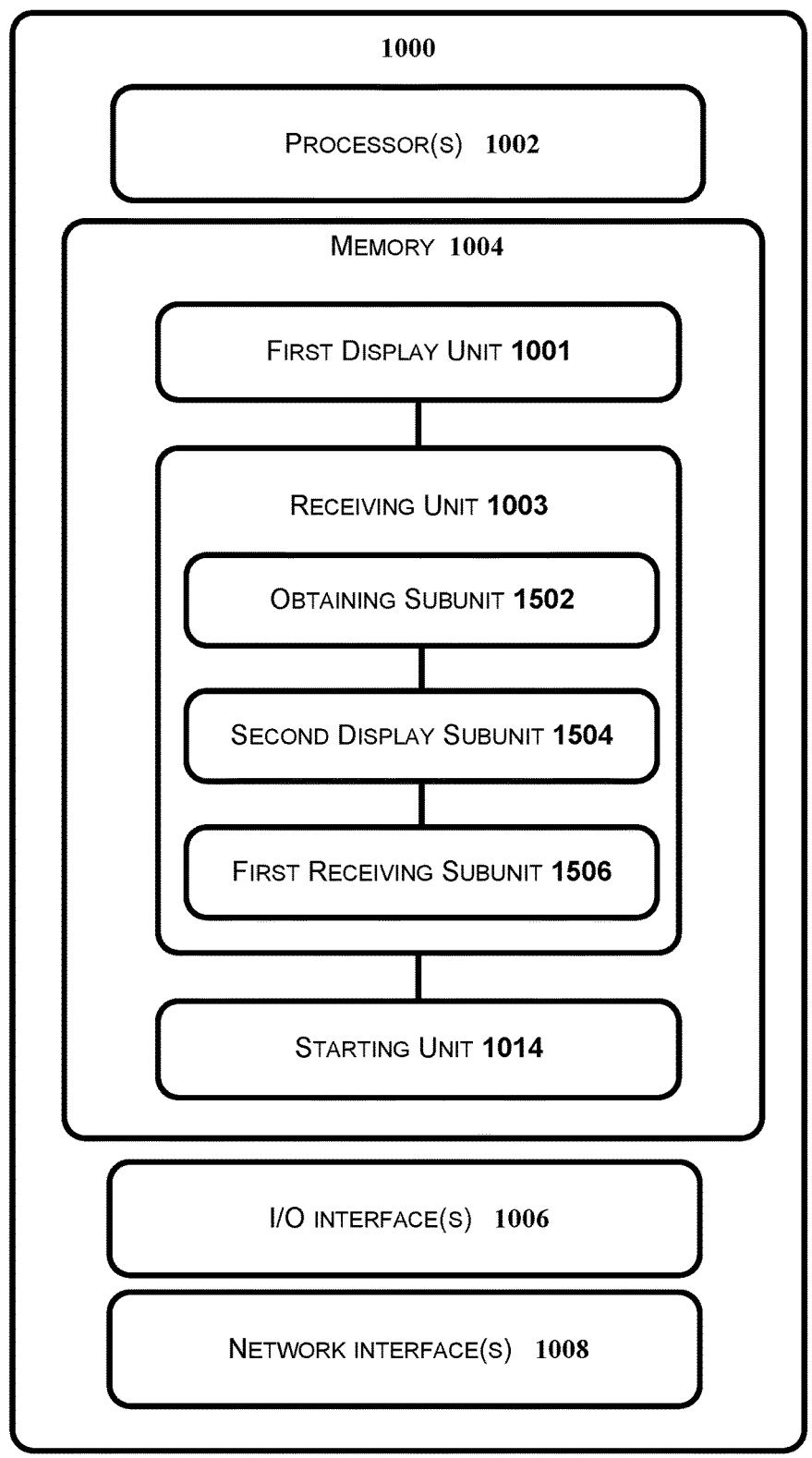
FIG. 15 is a structural schematic diagram of yet another example device for unlocking a terminal according to an example embodiment of the present disclosure.

In an example embodiment, as shown in FIG. 15, the receiving unit 1012 may include an obtaining subunit 1502, a second display subunit 1504, and a first receiving subunit 1506.

The obtaining subunit 1502 is configured to obtain a password box display instruction generated by operating the masking layer, wherein the password box display instruction is used to indicate to display the unlocking prompt information on the screen of the terminal. The second display subunit 1504 is configured to display the unlocking prompt information on the screen of the terminal in response to the password box display instruction. The first receiving subunit 1506 is configured to receive the unlocking instruction input through the unlocking prompt information.

It should be noted that the obtaining subunit 1502, the second display subunit 1504, and the first receiving subunit 1506 correspond to steps S702 to S706 in the first example embodiment, and the three subunits are the same as the examples and application scenarios implemented by the corresponding steps, but they are not limited to the disclosure of the first example embodiment. It should be noted that the above subunits can be operated as part of the device in the computer terminal 10 provided by the first example embodiment.

Figure 16:
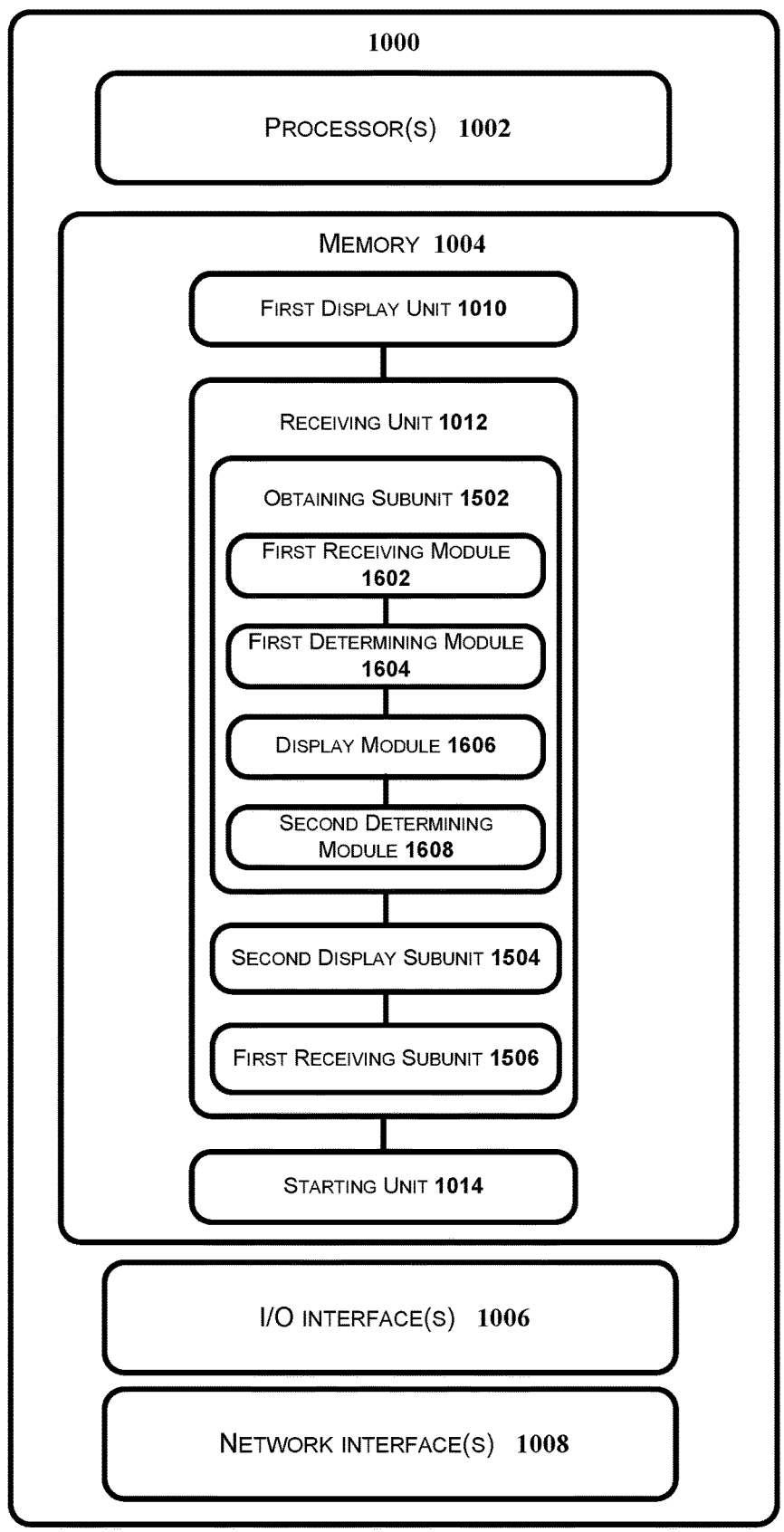
FIG. 16 is a structural schematic diagram of yet another example device for unlocking a terminal according to an example embodiment of the present disclosure.

In an example embodiment, as shown in FIG. 16, the obtaining subunit 1502 may include a first receiving module 1602, a first determining module 1604, a display module 1606, and a second determining module 1608.

The first receiving module 1602 is configured to receive a predetermined operation performed on the masking layer, wherein the predetermined operation includes a tapping operation and a swiping operation. The first determining module 1604 is configured to determine an operation area corresponding to the operation position where the predetermined operation is performed. The module 1605 is configured to display a general layer of the application in the operation area. The second determining module 1608 is configured to determine that the password box display instruction is received when the predetermined operation indicates that the display size of the general layer is greater than or equal to the first preset size.

It should be noted that the first receiving module 1602, the first determining module 1604, the display module 1606, and the second determining module 1608 correspond to steps S802 to S808 in the first example embodiment, and the four modules are the same as the examples and application scenarios implemented by the corresponding steps, but they are not limited to the disclosure of the first example embodiment. It should be noted that the above modules can be operated as part of the device in the computer terminal 10 provided by the first example embodiment.

Figure 17:
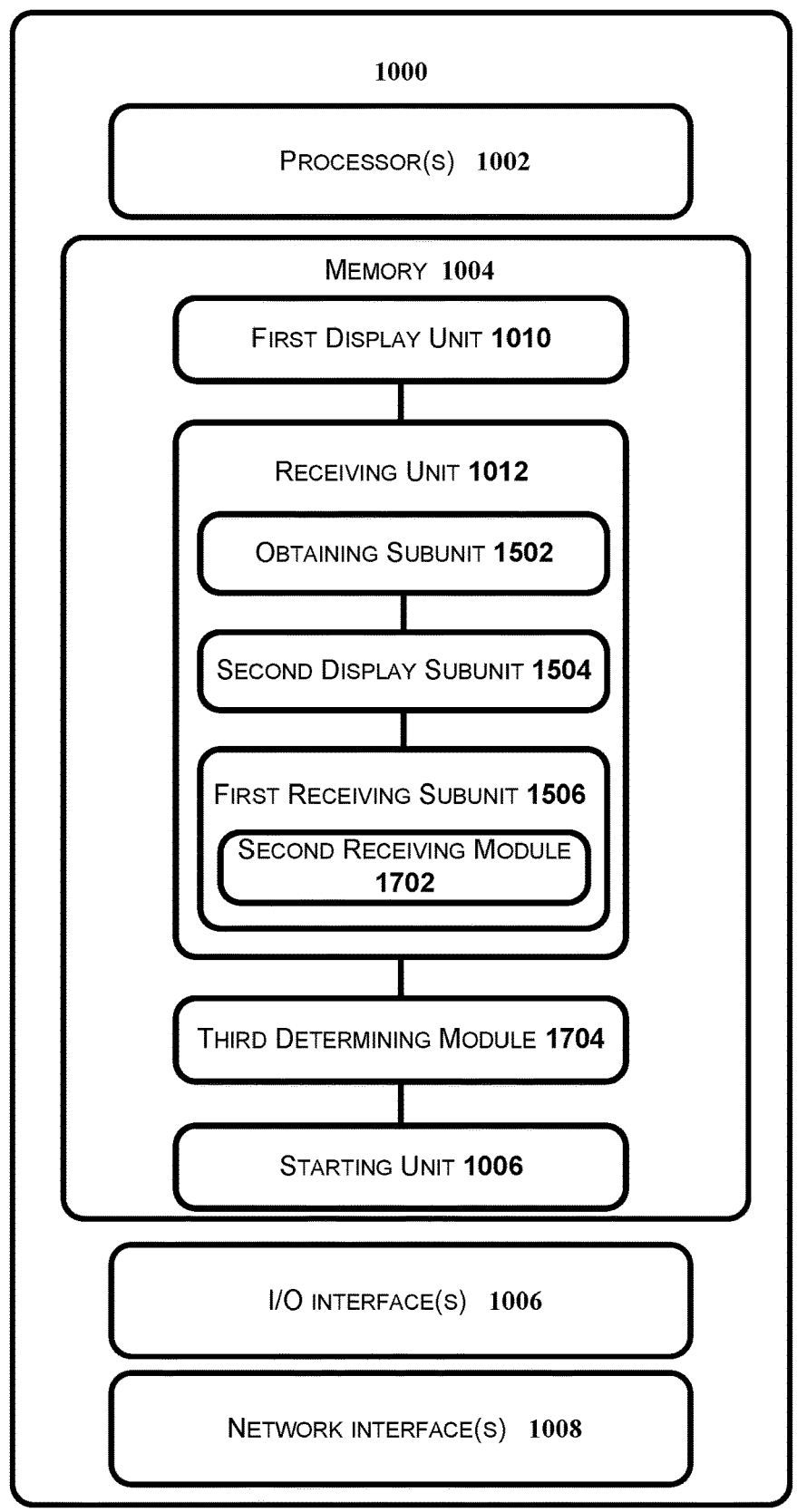
FIG. 17 is a structural schematic diagram of yet another example device for unlocking a terminal according to an example embodiment of the present disclosure.

In an example embodiment, as shown in FIG. 17, in a case where the unlocking prompt information is a password input box, the first receiving subunit 1506 may include a second receiving module 1702; the device 1000 may further include a third determining unit 1704 in the memory 1004.

The second receiving module 1702 is configured to receive an unlocking instruction input in the password input box. The third determining unit 1704 is configured to determine that the unlocking instruction matches the preset instruction if the unlocking password carried in the unlocking instruction is consistent with the preset password.

It should be noted that the foregoing second receiving module 1702 corresponds to step S810 in the first example embodiment. The module is the same as the example and application scenario implemented by the corresponding steps, but it is not limited to the disclosure of the first example embodiment. It should be noted that the above module can be operated as part of the device in the computer terminal 10 provided by the first example embodiment. In addition, the third determining unit 1704 corresponds to the step S812 in the first example embodiment. The unit is the same as the example and the application scenario implemented by the corresponding steps, but it is not limited to the disclosure of the first example embodiment. It should be noted that the above unit can be operated as part of the device in the computer terminal 10 provided by the first example embodiment.

Figure 18:
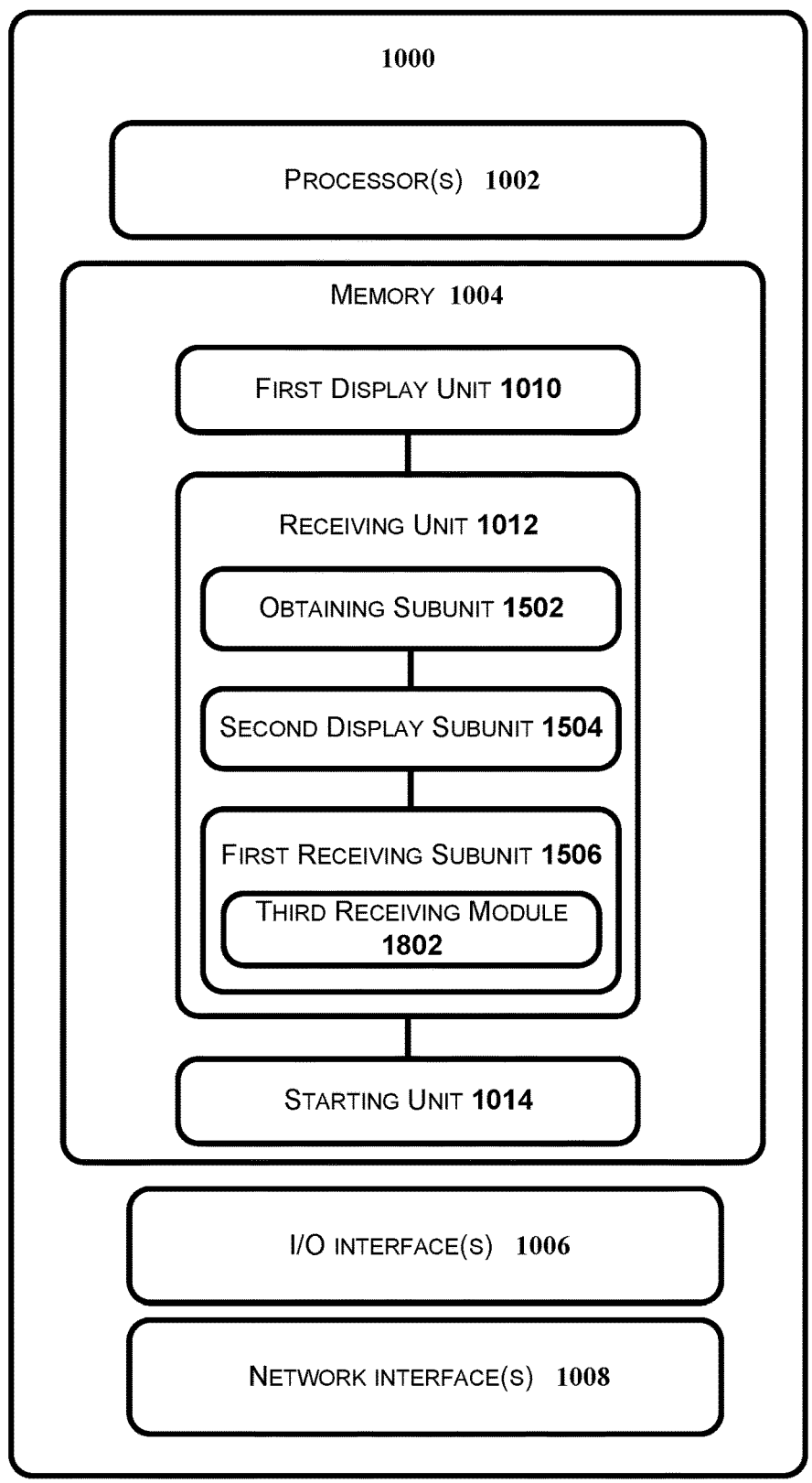
FIG. 18 is a structural schematic diagram of yet another example device for unlocking a terminal according to an example embodiment of the present disclosure.

In an example embodiment, as shown in FIG. 18, in a case where the unlocking prompt information is an unlocking button, the first receiving subunit 1506 may include a third receiving module 1802.

The third receiving module 1802 is configured to receive an unlocking instruction generated by pressing the unlocking button.

It should be noted that the third receiving module 1802 corresponds to step S814 in the first example embodiment. The module is the same as the example and application scenario implemented by the corresponding steps, but it is not limited to the disclosure of the first example embodiment. It should be noted that the above module can be operated as part of the device in the computer terminal 10 provided by the first example embodiment.

Figure 19:
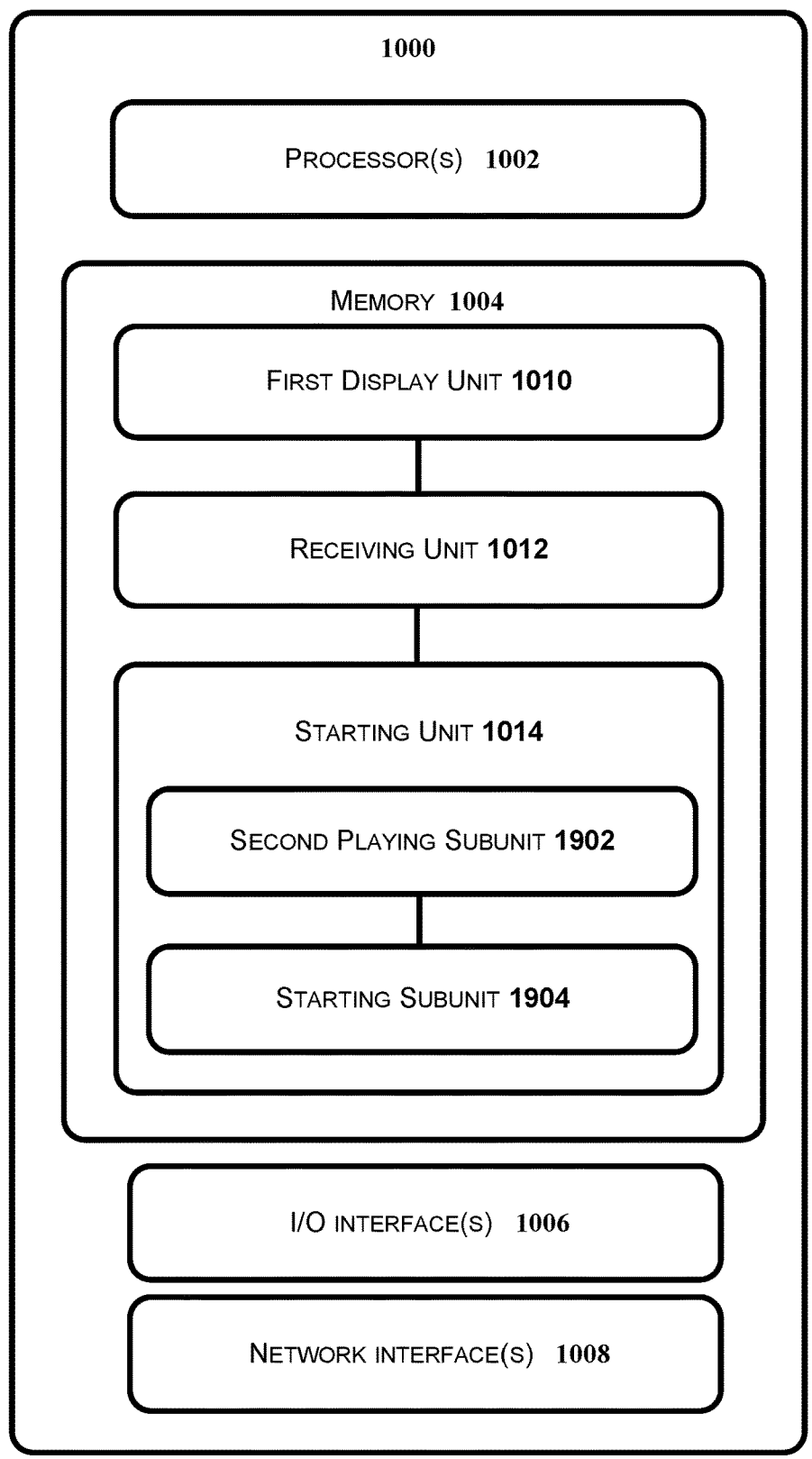
FIG. 19 is a structural schematic diagram of yet another example device for unlocking a terminal according to an example embodiment of the present disclosure.

In an example embodiment, as shown in FIG. 19, the starting unit may include a second playing subunit 1902, and a starting subunit 1904.

The second playing subunit 1902 is configured to play a switching animation. The first frame of the switching animation is a masking layer, and the last frame of the switching animation is a general layer of the application. The stating subunit 1904 is configured to start the application after the switching animation is finished.

It should be noted that the second playing subunit 1902 and the starting subunit 1904 correspond to steps S902 to S904 in the first example embodiment, and the two subunits are the same as the examples and application scenarios implemented by the corresponding steps, but they are not limited to the disclosure of the first example embodiment. It should be noted that the above subunits can be operated as part of the device in the computer terminal 10 provided by the first example embodiment.

Figure 20:
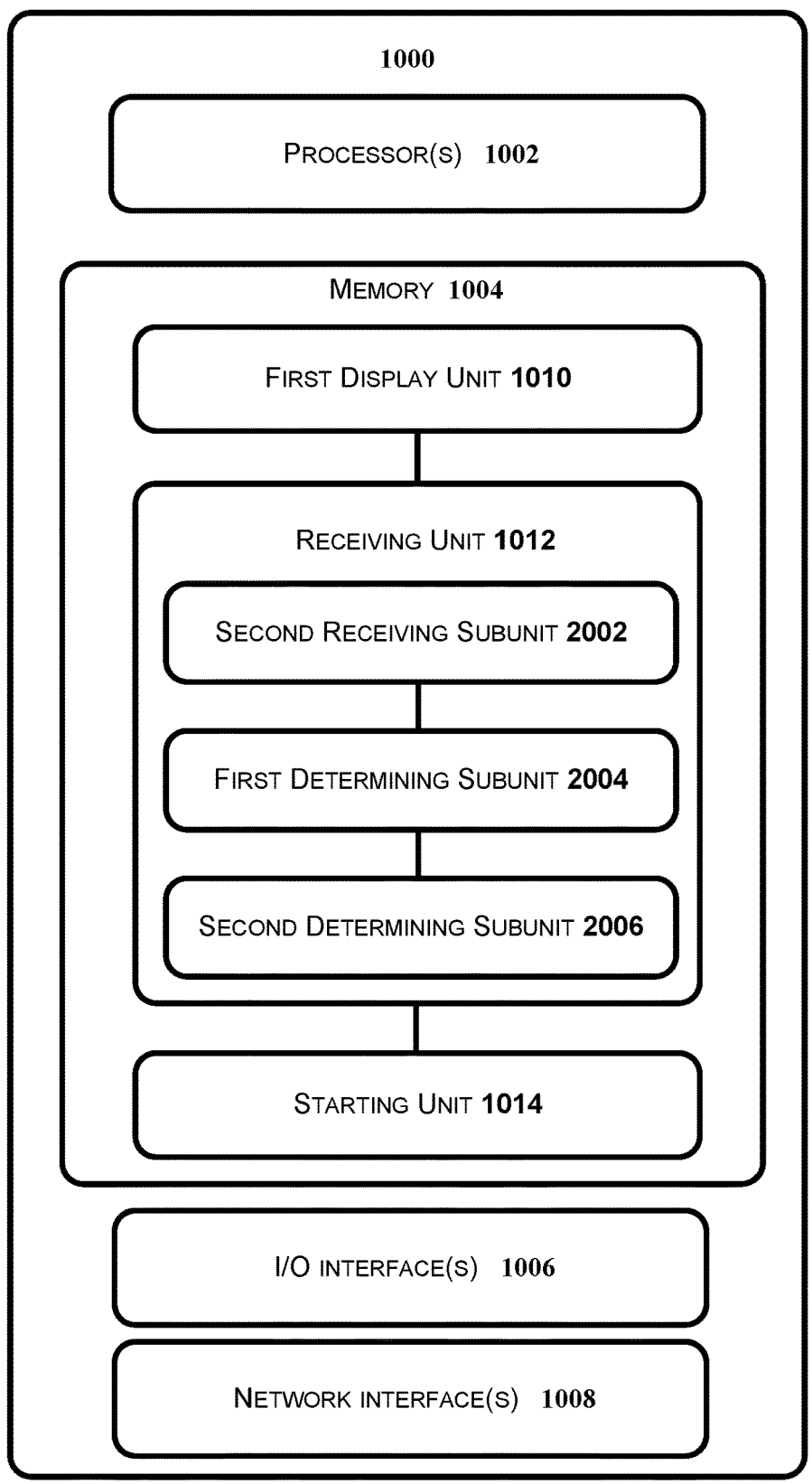
FIG. 20 is a structural schematic diagram of yet another example device for unlocking a terminal according to an example embodiment of the present disclosure.

In an example embodiment, as shown in FIG. 20, the receiving unit 1012 may include a second receiving subunit 2002, a first determining subunit 2004, and a second determining subunit 2006.

The second receiving subunit 2002 is configured to receive a predetermined operation performed on the masking layer, wherein the predetermined operation includes a tapping operation and a swiping operation. The first determining subunit 2004 is configured to determine an operation area corresponding to the operation position where the predetermined operation is performed. The second determining subunit 2006 is configured to determine that the unlocking instruction is received when the size of the operating area is greater than the second preset size.

It should be noted that the second receiving subunit 2002, the first determining subunit 2004, and the second determining subunit 2006 correspond to steps S906 to S910 in the first example embodiment, and the three subunits are the same as the examples and the application scenarios implemented by the corresponding steps, but they are not limited to the disclosure of the first example embodiment. It should be noted that the above subunits can be operated as part of the device in the computer terminal 10 provided by the first example embodiment.

Third Example Embodiment

An example embodiment of the present disclosure may provide a computer terminal, which may be any computer terminal device in the computer terminal group. In an example embodiment, the above computer terminal can also be replaced with a terminal device such as a mobile terminal.

In an example embodiment, the above computer terminal may be located in at least one of a plurality of network devices of the computer network.

In this example embodiment, the above computer terminal can execute the program code of the following steps in the method for unlocking a terminal of the application: displaying the masking layer on the screen of the terminal in a case where the start instruction for starting the application is received; receiving the unlocking instruction input based on the masking layer; starting the application in a case where the unlocking instruction matches the preset instruction.

Using the above example embodiment of the present disclosure, the purpose of starting the application in a case where the unlocking instruction matches the preset instruction is realized by displaying the masking layer on the screen of the terminal when the start instruction for starting the application is received, and then receiving the unlocking instruction input based on the masking layer. Therefore, the technical effect of enhancing the concealment and diversity of the terminal unlocking method and improving the security of the terminal unlocking method is realized and the technical problem that the terminal unlocking method in the conventional techniques is less secure is solved.

Figure 21:
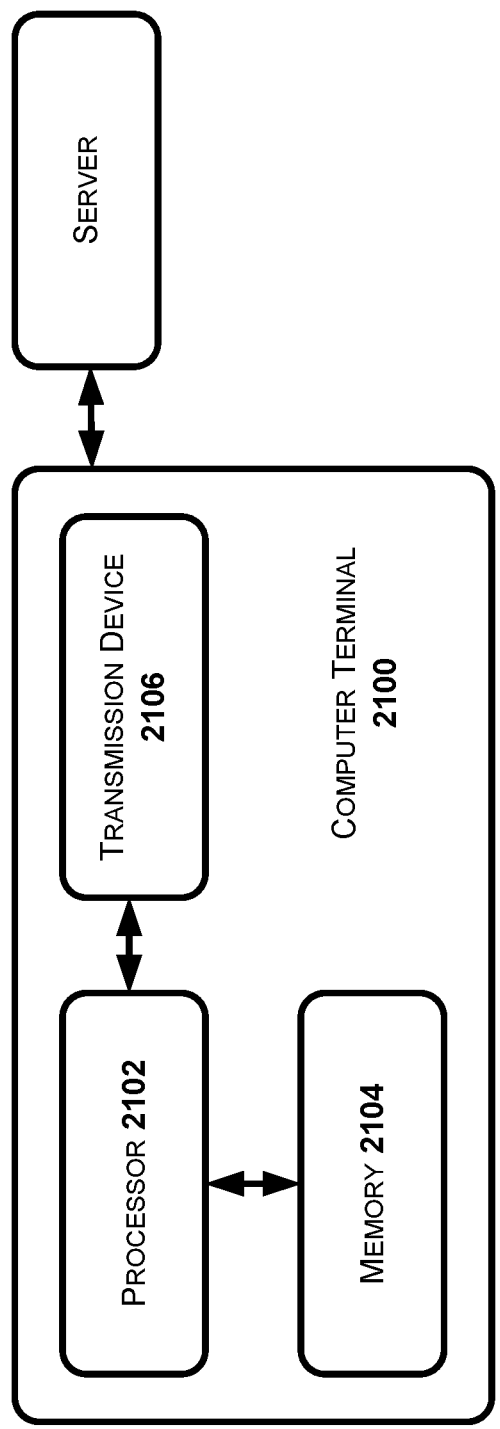
FIG. 21 is a structural block diagram of a computer terminal according to an example embodiment of the present disclosure.

In an example embodiment, FIG. 21 is a block diagram of a computer terminal according to an example embodiment of the present disclosure. As shown in FIG. 21, a computer terminal 2100 may include one or more (only one is shown in the figure) processor 2102, a memory 2104, and a transmission device 2106.

The memory 2104 can be used to store a software program and a module, such as a program instruction/module corresponding to the security vulnerability detection method and device in an example embodiment of the present disclosure. By executing the software program and the module stored in the memory 2104, the processor 2102 executes various functional applications and data processing, that is, realizes the method for detecting attacks to above system vulnerability. The memory 2104 can include high-speed random access memory, and can also include non-volatile memory, such as one or more magnetic storage devices, flash memory, or other non-volatile solid-state memory. In some examples, the memory 2104 can further include memory remotely located relative to the processor. This memory can be connected to terminal A over a network. Examples of such networks include, but are not limited to, the Internet, intranets, local area networks, mobile communication networks, and combinations thereof.

The above transmission device 2106 is configured for receiving or transmitting data via a network. Examples of the above network may include a wired network and a wireless network. In one example, the transmission device 2106 includes a Network Interface Controller (NIC) that can be connected to other network devices and routers via a network cable to communicate with the Internet or a local area network. In one example, the transmission device 2106 is a Radio Frequency (RF) module for communicating with the Internet wirelessly.

For example, the memory 2104 is configured to store the information of the preset action condition and the preset permission user, and the application.

The processor 2102 can call the information and the application stored by the memory 2104 through the transmission device 2106 to perform the following steps: displaying a masking layer on the screen of the terminal in a case where the start instruction for starting the application is received; receiving the unlocking instruction input based on the masking layer; starting the application in a case where the unlocking instruction matches a preset instruction.

In an example embodiment, the processor 2102 may further execute the following program code: judging whether the unlocking instruction is an airflow instruction and determining that the unlocking instruction matches the preset instruction in a case where the unlocking instruction is an airflow instruction.

In an example embodiment, the processor 2102 may further execute the following program code: judging whether the unlocking instruction is an airflow instruction; if the unlocking instruction is an airflow instruction, then judging whether the airflow intensity of the airflow instruction is greater than a preset intensity; if the airflow intensity of the airflow instruction is greater than the preset intensity, then determining that the unlocking instruction matches the preset instruction.

In an example embodiment, the processor 2102 may further execute the following program code: if it is judged that the unlocking instruction is not an airflow instruction, judging whether the unlocking instruction is a layer scraping instruction, wherein the layer scraping instruction is an instruction generated by performing a predetermined operation on the masking layer, and the predetermined operation includes a tapping operation and a swiping operation; if the unlocking instruction is a layer scraping instruction, in response to the layer scraping instruction, determining an area corresponding to the operation position where the predetermined operation is performed, and displaying a general layer in the area; when the display size of the general layer is larger than or equal to a first preset size, displaying the desktop on the screen of the terminal.

In an example embodiment, the processor 2102 may further execute the following program code: playing a switching animation, wherein the first frame of the switching animation is the masking layer, and the last frame of the switching animation is a general layer of the application; displaying the desktop on the screen of the terminal after the switching animation is finished.

In an example embodiment, the processor 2102 may further execute the following program code: obtaining a password box display instruction generated by operating the masking layer, wherein the password box display instruction is used to indicate to display the unlocking prompt information on the screen of the terminal; displaying the unlocking prompt information on the screen of the terminal in response to the password box display instruction; receiving the unlocking instruction input through the unlocking prompt information.

In an example embodiment, the processor 2102 may further execute the following steps: receiving the predetermined operation performed on the masking layer, wherein the predetermined operation includes a tapping operation and a swiping operation; determining an operation area corresponding to the operation position where the predetermined operation is performed; displaying the general layer of the application; determining that the password box display instruction is received when the predetermined operation indicates that the display size of the general layer is greater than or equal to the first preset size.

In an example embodiment, the processor 2102 may further execute the following program code: receiving an unlocking instruction inputting in a password input box.

In an example embodiment, the processor 2102 may further execute the following program code: if the unlocking password carried in the unlocking instruction is consistent with the preset password, determining that the unlocking instruction matches the preset instruction.

In an example embodiment, the processor 2102 may further execute the following program code: receiving an unlocking instruction generated by pressing an unlock button.

In an example embodiment, the processor 2102 may further execute the following program code: playing a switching animation, wherein the first frame of the switching animation is a masking layer, and the last frame of the switching animation is a general layer of the application; starting the application after the switching animation is completed.

In an example embodiment, the processor 2102 may further execute the following steps: receiving a predetermined operation performed on the masking layer, wherein the predetermined operation includes a tapping operation and a swiping operation; determining an operation area corresponding to the operation position where the predetermined operation is performed; determining that the unlocking instruction is received when the size of the operation area is larger than a second preset size.

A person of ordinary skill in the art should understand that the structure shown in FIG. 21 is merely illustrative, and the computer terminal can be a terminal device such as smart mobile phone (such as Android mobile phone, iOS mobile phone, etc.), tablet computer, handheld computer, mobile internet devices (MID), and PAD, etc. FIG. 21 does not limit the structure of the above electronic devices. For example, the computer terminal A may also include more or fewer components (such as network interface, display device, etc.) than that shown in FIG. 21, or have a different configuration from that shown in FIG. 21.

A person of ordinary skill in the art should understand that all or part of steps in various methods of the above example embodiments can be implemented by a program to instruct the related hardware of the terminal device. The program can be stored in a computer-readable storage medium. The storage medium may include a flash disk, a read-only memory (ROM), a random access memory (RAM), a magnetic disk or an optical disk, and the like.

Fourth Example Embodiment

An example embodiment of the present disclosure also provides a storage medium. In an example embodiment, the foregoing storage medium may be used to store the program code executed by the terminal unlocking method provided by the first example embodiment.

In an example embodiment, the foregoing storage medium may be located in any computer terminal in the computer terminal group in the computer network, or in any mobile terminal in the mobile terminal group.

In an example embodiment, the storage medium is arranged to store program code for performing the following steps: displaying a masking layer on the screen of a terminal in a case where a start instruction for starting an application is received; receiving an unlocking instruction input based on the masking layer; starting the application in a case where the unlocking instruction matches a preset instruction.

Using the above example embodiment of the present disclosure, the purpose of starting the application in a case where the unlocking instruction matches the preset instruction is realized by displaying the masking layer on the screen of the terminal when the start instruction for starting the application is received, and then receiving the unlocking instruction input based on the masking layer. Therefore, the technical effect of enhancing the concealment and diversity of the terminal unlocking method and improving the security of the terminal unlocking method is realized and the technical problem that the terminal unlocking method in the conventional techniques is less secure is solved.

It should be noted that any one of the above computer terminal groups can establish a communication relationship with the website server and the scanner, and the scanner can scan the value command of the web application executed by PHP on the computer terminal.

The above example embodiment of the present disclosure is for the purpose of description only and does not represent the advantages and disadvantages of the example embodiment.

In the above example embodiments of the present disclosure, the descriptions of the various example embodiments are different, and for the parts not detailed in an example embodiment, one can refer to the descriptions of other example embodiments.

In several example embodiments provided by the present disclosure, it should be understood that the disclosed technical contents may be implemented in other manners. The device example embodiments described above are merely illustrative. For example, the division of the units is only a logical function division. In actual implementation, there may be another manner for the division. For example, multiple units or components may be combined or may be integrated into another system, or some features can be ignored, or not executed. In addition, the mutual coupling or direct coupling or communication connection shown or discussed may be an indirect coupling or communication connection through some interface, unit or module, and may be electrical or otherwise.

The units described as separate components may or may not be physically separated, and the components displayed as units may or may not be physical units, that is, they may be located in one place, or may be distributed to multiple network units. Some or all of the units may be selected according to actual needs to achieve the purpose of the present example embodiment.

In addition, each functional unit in each example embodiment of the present disclosure may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer-readable storage medium. Based on such an understanding, the technical solution of the present disclosure in essence or its contributive part to the conventional techniques may be embodied in the form of a software product in part or in whole. The software product is stored in a storage medium and includes a plurality of instructions for causing a computer device (which may be a personal computer, a server, a network device, etc.) to perform all or part of the steps of the method of each example embodiment of the present disclosure.

The computer-readable storage medium includes a U-disk, a read-only memory (ROM), a random access memory (RAM), a removable hard disk, a magnetic disk, or an optical disk, and the like. The computer-readable storage medium includes non-volatile and volatile media as well as movable and non-movable media, and may implement information storage by means of any method or technology. Information may be a computer readable instruction, a data structure, and a module of a program or other data. Examples of the storage medium of a computer include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The above descriptions are only example embodiments of the present disclosure, and it should be noted that those skilled in the art can make several improvements and refinements without departing from the principle of the present disclosure. These improvements and refinements should also be considered as the scope of protection of the present disclosure.

The present disclosure may further be understood with clauses as follows.

Clause 1. A method for unlocking a terminal, comprising:

in a case where a start instruction for starting an application is received, displaying a masking layer on the screen of the terminal;

receiving an unlocking instruction input based on the masking layer;

in a case where the unlocking instruction matches a preset instruction, starting the application.

Clause 2. The method according to clause 1, wherein after receiving the unlocking instruction input based on the masking layer, the method further comprises:

judging whether the unlocking instruction is an airflow instruction;

if the unlocking instruction is the airflow instruction, determining that the unlocking instruction matches the preset instruction.

Clause 3. The method according to clause 1, wherein after receiving the unlocking instruction input based on the masking layer, the method further comprises:

judging whether the unlocking instruction is an airflow instruction;

if the unlocking instruction is the airflow instruction, judging whether an airflow intensity of the airflow instruction is greater than a preset intensity;

if the airflow intensity of the airflow instruction is greater than the preset intensity, determining that the unlocking instruction matches the preset instruction.

Clause 4. The method according to clause 2 or 3, wherein after judging whether the unlocking instruction is the airflow instruction, the method further comprises:

if the unlocking instruction is judged as not being the airflow instruction, judging whether the unlocking instruction is a layer scraping instruction, wherein the layer scraping instruction is an instruction generated by performing a predetermined operation on the masking layer, and the predetermined operation includes a tapping operation and a swiping operation;

if the unlocking instruction is the layer scraping instruction, in response to the layer scraping instruction, determining an area corresponding to an operation position where the predetermined operation is performed, and displaying a general layer in the area;

when a display size of the general layer is greater than or equal to a first preset size, displaying a desktop on a screen of the terminal.

Clause 5. The method according to clause 4, wherein the displaying the desktop on the screen of the terminal comprises:

playing a switching animation, wherein the first frame of the switching animation is the masking layer, and the last frame of the switching animation is the general layer of the application;

after the switching animation is finished, displaying the desktop on the screen of the terminal.

Clause 6. The method according to clause 1, wherein receiving the unlocking instruction input based on the masking layer comprises:

obtaining a password box display instruction generated by operating the masking layer, wherein the password box display instruction is used to indicate to display an unlocking prompt information on the screen of the terminal;

displaying the unlocking prompt information on the screen of the terminal in response to the password box displaying instruction;

receiving the unlocking instruction input through the unlocking prompt information.

Clause 7. The method according to clause 6, wherein obtaining the password box display instruction generated by operating the masking layer comprises:

receiving a predetermined operation performed on the masking layer, wherein the predetermined operation includes a tapping operation and a swiping operation;

determining an operation area corresponding to an operation position where the predetermined operation is performed;

displaying a general layer of the application in the operation area;

when the predetermined operation indicates that a display size of the general layer is greater than or equal to a first preset size, determining that the password box display instruction is received.

Clause 8. The method according to clause 6, wherein in a case where the unlocking prompt information is a password input box, receiving the unlocking instruction input through the unlocking prompt information includes: receiving an unlocking instruction input into the password input box;

after receiving the unlocking instruction input into the password input box, the method further includes: if an unlocking password carried in the unlocking instruction is consistent with a preset password, determining that the unlocking instruction matches the preset instruction.

Clause 9. The method according to clause 6, wherein in a case where the unlocking prompt information is an unlocking button, receiving the unlocking instruction input through the unlocking prompt information includes:

receiving the unlocking instruction generated by pressing the unlocking button.

Clause 10. The method according to clause 1, wherein receiving the unlocking instruction input based on the masking layer input comprises:

receiving a predetermined operation performed on the masking layer, wherein the predetermined operation includes a tapping operation and a swiping operation;

determining an operation area corresponding to an operation position where the predetermined operation is performed;

when the size of the operation area is larger than a second preset size, determining that the unlocking instruction is received.

Clause 11. The method according to clause 1, wherein starting the application comprises:

playing a switching animation, wherein the first frame of the switching animation is the masking layer, and the last frame of the switching animation is a general layer of the application;

after the switching animation is finished, starting the application.

Clause 12. A device for unlocking a terminal, comprising:

a first display unit configured to display a masking layer on a screen of the terminal in a case where a start instruction for starting an application is received;

a receiving unit configured to receive an unlocking instruction input based on the masking layer;

a starting unit configured to start the application in a case where the unlocking instruction matches a preset instruction.

Clause 13. The device according to clause 12, wherein the device further comprises:

a first judging unit configured to judge whether the unlocking instruction is an airflow instruction;

a first determining unit configured to determine that the unlocking instruction matches the preset instruction if the unlocking instruction is the airflow instruction.

Clause 14. The device according to clause 12, wherein the device further comprises:

a second judging unit configured to judge whether the unlocking instruction is an airflow instruction;

a third judging unit configured to judge whether an airflow intensity of the airflow instruction is greater than a preset intensity if the unlocking instruction is the airflow instruction;

a second determining unit configured to determine that the unlocking instruction matches the preset instruction if the airflow intensity of the airflow instruction is greater than the preset intensity.

Clause 15. The device according to clause 13 or 14, wherein the device further comprises:

a fourth judging unit configured to judge whether the unlocking instruction is a layer scraping instruction if the unlocking instruction is not the airflow instruction, wherein the layer scraping instruction is generated by performing a predetermined operation on the masking layer, and the predetermined operation includes a tapping operation and a swiping operation;

a processing unit configured to, if the unlocking instruction is the layer scraping instruction, determine an area corresponding to an operation position where the predetermined operation is performed and display a general layer in the area in response to the layer scraping instruction;

a second display unit configured to display a desktop on the screen of the terminal when a display size of the general layer is greater than or equal to a first preset size.

Clause 16. The device according to clause 15, wherein the second display unit comprises:

a first playing subunit configured to play a switching animation, wherein the first frame of the switching animation is the masking layer, and the last frame of the switching animation is the general layer of the application;

a first display subunit configured to display the desktop on the screen of the terminal after the switching animation is finished.

Clause 17. The device according to clause 12, wherein the receiving unit comprises:

an obtaining subunit configured to obtain a password box display instruction generated by operating the masking layer, wherein the password box display instruction is used to indicate to display an unlocking prompt information on the screen of the terminal;

a second display subunit configured to display the unlocking prompt information on the screen of the terminal in response to the password box display instruction;

a receiving subunit configured to receive the unlocking instruction input through the unlocking prompt information.

Clause 18. The device according to clause 17, wherein the obtaining subunit comprises:

a first receiving module configured to receive a predetermined operation performed on the masking layer, wherein the predetermined operation includes a tapping operation and a swiping operation;

a first determining module configured to determine an operation area corresponding to an operation position where the predetermined operation is performed;

a display module configured to display a general layer of the application in the operation area;

a second determining module configured to determine that the password box display instruction is received when the predetermined operation indicates that a display size of the general layer is greater than or equal to a first preset size.

Clause 19. The device according to clause 17, wherein in a case where the unlocking prompt information is a password input box, the receiving subunit includes: a second receiving module configured to receive the unlocking instruction input into the password input box;

the device further includes: a third determining unit configured to determine that the unlocking instruction matches the preset instruction if the unlocking password carried in the unlocking instruction is consistent with a preset password.

Clause 20. The device according to clause 17, wherein in a case where the unlocking prompt information is an unlocking button, the receiving subunit includes:

a third receiving module configured to receive the unlocking instruction generated by pressing the unlocking button.

Clause 21. The device according to clause 12, wherein the starting unit comprises:

a second playing subunit configured to play a switching animation, wherein the first frame of the switching animation is the masking layer, and the last frame of the switching animation is a general layer of the application;

a starting subunit configured to start the application after the switching animation is finished.

What is claimed is:

1. A method comprising:

receiving a start instruction for starting an application;

displaying a masking layer on a screen of a terminal;

receiving a swiping operation performed on the masking layer;

obtaining a password box display instruction in response to the swiping operation performed on the masking layer;

displaying an unlocking prompt information on the screen of the terminal in response to the password box displaying instruction;

receiving an unlocking instruction with respect to the application input through the terminal;

determining that the unlocking instruction matches a preset instruction; and starting the application.

2. The method according to claim 1, wherein the determining that the unlocking instruction matches a preset instruction further comprises:

determining that the unlocking instruction comprises an airflow instruction; and determining that the unlocking instruction matches the preset instruction.

3. The method according to claim 2, further comprises:

if the unlocking instruction is determined as not comprising the airflow instruction, determining whether the unlocking instruction is a layer scraping instruction, wherein the layer scraping instruction is an instruction generated by performing a predetermined operation on the masking layer, and the predetermined operation includes a tapping operation and a swiping operation;

if the unlocking instruction is determined as the layer scraping instruction, in response to the layer scraping instruction, determining an area corresponding to an operation position where the predetermined operation is performed, and displaying a general layer in the area; and when a display size of the general layer is determined as greater than or equal to a first preset size, displaying a desktop on a screen of the terminal.

4. The method according to claim 3, wherein the displaying the desktop on the screen of the terminal comprises:

playing a switching animation, wherein a first frame of the switching animation is the masking layer, and a last frame of the switching animation is the general layer of the application; and after the switching animation is finished, displaying the desktop on the screen of the terminal.

5. The method according to claim 1, wherein the determining that the unlocking instruction matches a preset instruction further comprises:

determining whether the unlocking instruction comprises an airflow instruction;

if the unlocking instruction is determined as comprising the airflow instruction, determining whether an airflow intensity of the airflow instruction is greater than a preset intensity; and if the airflow intensity of the airflow instruction is determined as greater than the preset intensity, determining that the unlocking instruction matches the preset instruction.

6. The method according to claim 1, wherein the obtaining the password box display instruction in response to the swiping operation performed on the masking layer comprises:

determining an operation area corresponding to an operation position where the swiping operation is performed;

displaying a general layer of the application in the operation area;

determining that the swiping operation indicates that a display size of the general layer is greater than or equal to a first preset size; and determining that the password box display instruction is received.

7. The method according to claim 1, further comprising:

determining that the unlocking prompt information is a password input box;

receiving an unlocking instruction input into the password input box;

determining that an unlocking password carried in the unlocking instruction is consistent with a preset password; and determining that the unlocking instruction matches the preset instruction.

8. The method according to claim 1, further comprising:

determining that the unlocking prompt information is an unlocking button; and receiving the unlocking instruction generated by pressing of the unlocking button.

9. The method according to claim 1, wherein the starting the application comprises:

playing a switching animation, wherein a first frame of the switching animation is the masking layer, and a last frame of the switching animation is a general layer of the application; and after the switching animation is finished, starting the application.

10. A device comprising:

one or more processors; and one or more memories storing thereon computer-readable instructions that, when executed by the one or more processors, cause the one or more processors to perform acts comprising:

receiving a start instruction for starting an application;

displaying a masking layer on a screen of a terminal;

receiving a swiping operation performed on the masking layer;

obtaining a password box display instruction in response to the swiping operation performed on the masking layer;

displaying an unlocking prompt information on the screen of the terminal in response to the password box displaying instruction;

receiving an unlocking instruction with respect to the application input through the terminal;

determining whether the unlocking instruction comprises an airflow instruction;

determining that the unlocking instruction matches a preset instruction if the unlocking instruction is determined as comprising the airflow instruction; and starting the application.

11. The device according to claim 10, wherein the acts further comprise:

determining whether an airflow intensity of the airflow instruction is greater than a preset intensity; and if the airflow intensity of the airflow instruction is determined as greater than the preset intensity, determining that the unlocking instruction matches the preset instruction.

12. The device according to claim 11, wherein the acts further comprise:

if the unlocking instruction is determined as not comprising the airflow instruction, determining whether the unlocking instruction is a layer scraping instruction, wherein the layer scraping instruction is an instruction generated by performing a predetermined operation on the masking layer, and the predetermined operation includes a tapping operation and a swiping operation;

if the unlocking instruction is determined as the layer scraping instruction, in response to the layer scraping instruction, determining an area corresponding to an operation position where the predetermined operation is performed, and displaying a general layer in the area; and when a display size of the general layer is determined as greater than or equal to a first preset size, displaying a desktop on a screen of the terminal.

13. The device according to claim 12, wherein the displaying the desktop on the screen of the terminal comprises:

playing a switching animation, wherein a first frame of the switching animation is the masking layer, and a last frame of the switching animation is the general layer of the application; and after the switching animation is finished, displaying the desktop on the screen of the terminal.

14. The device according to claim 10, wherein the obtaining the password box display instruction in response to the swiping operation performed on the masking layer comprises:

determining an operation area corresponding to an operation position where the swiping operation is performed;

displaying a general layer of the application in the operation area;

determining that the swiping operation indicates that a display size of the general layer is greater than or equal to a first preset size; and determining that the password box display instruction is received.

15. The device according to claim 10, wherein the acts further comprise:

determining that the unlocking prompt information is a password input box;

receiving an unlocking instruction input into the password input box;

determining that an unlocking password carried in the unlocking instruction is consistent with a preset password; and determining that the unlocking instruction matches the preset instruction.

16. The device according to claim 10, wherein the acts further comprise:

determining that the unlocking prompt information is an unlocking button; and receiving the unlocking instruction generated by pressing of the unlocking button.

17. One or more memories storing thereon computer-readable instructions that, when executed by one or more processors, cause the one or more processors to perform acts comprising:

receiving a start instruction for starting an application;

displaying a masking layer on a screen of a terminal;

receiving a swiping operation performed on the masking layer;

obtaining a password box display instruction in response to the swiping operation performed on the masking layer;

displaying an unlocking prompt information on the screen of the terminal in response to the password box displaying instruction;

receiving an unlocking instruction with respect to the application input through the terminal;

determining whether the unlocking instruction comprises an airflow instruction;

if the unlocking instruction is determined as comprising the airflow instruction, determining whether an airflow intensity of the airflow instruction is greater than a preset intensity;

if the airflow intensity of the airflow instruction is determined as greater than the preset intensity, determining that the unlocking instruction matches the preset instruction; and starting the application.

\* \* \* \* \*